United States Patent [19]

Dehnert et al.

[11] 4,146,535
[45] Mar. 27, 1979

[54] AZO DYES HAVING A 3-CYANO- OR 3-CARBAMOYL-2,6-DIAMINO-PYRIDINE COUPLING COMPONENT

[75] Inventors: Johannes Dehnert, Ludwigshafen; Gunther Lamm, Hassloch; Werner Jüenemann; Guenter Meyer, both of Ludwigshafen, all of Fed. Rep. of Germany

[73] Assignee: BASF Aktiengesellschaft, Fed. Rep. of Germany

[21] Appl. No.: 728,527

[22] Filed: Oct. 1, 1976

[30] Foreign Application Priority Data

Oct. 29, 1975 [AT] Austria ............................ 8223/75

[51] Int. Cl.$^2$ ...................... C09B 29/36; C09B 31/14
[52] U.S. Cl. ................................... 260/156; 260/152; 260/205; 260/207.1; 8/21 C; 8/41 R; 8/41 C; 8/54.2; 546/289
[58] Field of Search ............................................ 260/156

[56] References Cited

U.S. PATENT DOCUMENTS

| 3,853,895 | 12/1974 | Lamm et al. | 260/156 X |
| 3,998,802 | 12/1976 | Dehnert et al. | 260/156 |
| 4,042,578 | 8/1977 | Dehnert et al. | 260/156 |

FOREIGN PATENT DOCUMENTS

2251702  5/1974  Fed. Rep. of Germany ............ 260/156

*Primary Examiner*—Charles F. Warren

*Attorney, Agent, or Firm*—Keil & Witherspoon

[57] ABSTRACT

Dye formulations for dyeing and printing cellulose and cellulosic textile material which in addition to conventional components contain a dye of the general formula (I):

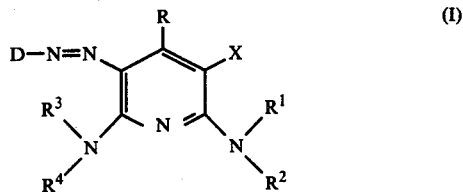

in which

D is the radical of a diazo component;

R is hydrogen, $C_1$ to $C_7$ alkyl, phenyl or phenyl bearing methyl as a substituent;

X is cyano, carbamoyl or substituted carbamoyl;

$R^1$ is hydrogen or an aliphatic, cycloaliphatic, araliphatic or aromatic radical;

$R^2$ is hydrogen or an aliphatic, cycloaliphatic or araliphatic radical;

$R^3$ and $R^4$ independently of one another have the same meanings as $R^1$ and $R^2$; and $R^1$—N—$R^2$ and $R^3$—N—$R^4$ independently of one another are saturated heterocyclic radicals.

1 Claim, No Drawings

AZO DYES HAVING A 3-CYANO- OR 3-CARBAMOYL-2,6-DIAMINO-PYRIDINE COUPLING COMPONENT

The invention relates to dye formulations for dyeing and printing cellulose or cellulosic textile material which in addition to conventional components contain a dye of the general formula (I):

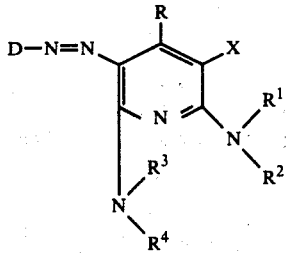

in which
D is the radical of a diazo component;
R is hydrogen, $C_1$ to $C_7$ alkyl, phenyl or phenyl bearing methyl as a substituent;
X is cyano, carbamoyl or substituted carbamoyl;
$R^1$ is hydrogen or an aliphatic, cycloaliphatic, araliphatic or aromatic radical;
$R^2$ is hydrogen or an aliphatic, cycloaliphatic or araliphatic radical;
$R^3$ and $R^4$ independently of one another have the same meanings as $R^1$ and $R^2$; and
$R^1-N-R^2$ and $R^3-N-R^4$ independently of one another are saturated heterocyclic radicals.

The radical D may be derived particularly from an amine of the benzene, naphthalene, benzothiazole, benzoisothiazole, thiazole, thiadiazole, indazole, pyrazole, thiophene, azobenzene, phthalimide, naphthalimide or anthraquinone series.

Examples of substituents of the radical of the diazo component D are:
in the benzene series: fluoro, chloro, bromo, nitro, cyano, trifluoromethyl, methylsulfonyl, ethylsulfonyl, phenylsulfonyl, carboxylic esters such as $C_1$ to $C_8$ alkoxycarbonyl, phenoxycarbonyl, phenoxyethoxycarbonyl or $\beta$-$C_1$ to $\beta$-$C_4$ alkoxyethoxycarbonyl, optionally N-monosubstituted or N,N-disubstituted carbamoyl or sulfamoyl, methyl, ethyl, butyl, octyl, hexyl, methoxy or ethoxy and also carboxy. N-substituents of carbamoyl or sulfamoyl are for example methyl, ethyl, phenyl, benzyl, phenylethyl, cyclohexyl, norbornyl, propyl, butyl, $\beta$-hydroxyethyl, $\gamma$-hydroxypropyl, $\beta$-methoxyethyl, $\gamma$-methoxypropyl, $\gamma$-ethoxypropyl and also pyrrolidide, piperidide and morpholide.

In the azobenzene series: fluoro, chloro, bromo, nitro, cyano, trifluoromethyl, methyl, ethyl, carboxy, methoxy and ethoxy, the carboxylic esters, carbamoyl and sulfamoyl radicals referred to under the benzene series, and hydroxy.

In the heterocyclic series: chloro, bromo, nitro, cyano, methyl, ethyl, phenyl, methoxy, ethoxy, methylmercapto, $\beta$-carbomethoxyethylmercapto, $\beta$-carboethoxyethylmercapto, carbomethoxy, carboethoxy, acetyl, methylsulfonyl and ethylsulfonyl.

In the anthraquinone series: chloro, bromo, amino, acetyl, methyl, ethyl, phenylamino, tolylamino, hydroxy, methoxy, ethoxy, cyano and carboxy.

In the benzene and naphthalene series diazo components are preferred which have at least one substituent which decreases the basicity such as methylsulfonyl, phenylsulfonyl, ethylsulfonyl, carboxylic ester, optionally N-substituted carbamoyl, chloro, bromo, trifluoromethyl and particularly cyano.

Radicals R other than hydrogen are for example ethyl, n-propyl, isopropyl, butyl, pentyl, $\alpha$-ethylpentyl, phenyl or methylphenyl and preferably methyl.

Examples of $R^1$, other than hydrogen, are the following substituents: alkyl of one to eight carbon atoms, alkyl of two to eight carbon atoms, alkyl of two to eight carbon atoms bearing hydroxy, cyano, alkoxy or one to eight carbon atoms, phenoxy, phenoxyethoxy or benzyloxy as a substituent, cyclohexyl, norbornyl, benzyl, phenylethyl, phenylhydroxyethyl, phenylpropyl, phenylbutyl, phenyl, phenyl bearing chloro, methyl, trifluoromethyl, pyrrolidonyl, methoxy or ethoxy as a substituent,
$C_5$ to $C_{12}$ polyalkoxyalkyl,
$C_4$ to $C_9$ hydroxypolyalkoxyalkyl,
$C_1$ to $C_8$ alkanoyloxy $C_2$ to $C_6$ alkyl,
$C_7$ to $C_{11}$ aroyloxy $C_2$ to $C_6$ alkyl,
$C_1$ to $C_8$ alkylaminocarbonyloxy $C_2$ to $C_6$ alkyl,
$C_6$ to $C_{10}$ arylaminocarbonyloxy $C_2$ to $C_6$ alkyl,
$C_1$ to $C_8$ alkoxycarbonyl $C_2$ to $C_7$ alkyl and
$C_1$ to $C_{18}$ alkanoyl, $C_8$ to $C_{10}$ aralkanoyl, $C_7$ to $C_{11}$ aroyl, $C_1$ to $C_4$ alkylsulfonyl and $C_6$ to $C_{10}$ arylsulfonyl.

In addition to those already specified, the following are specific examples of suitable radicals $R^1$:
1: unsubstituted or substituted alkyl:
$CH_3$, $C_2H_5$, n— and i—$C_3H_7$, n— and i—$C_4H_9$, $C_6H_{13}$,

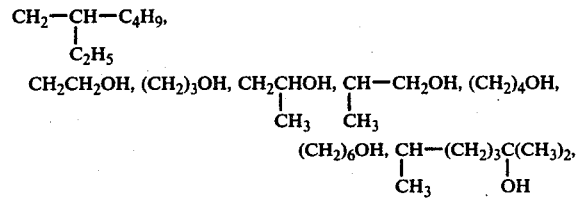

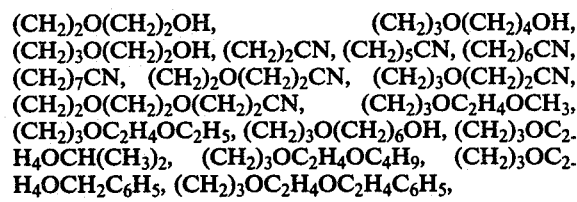

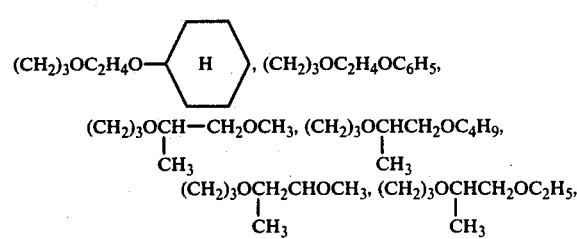

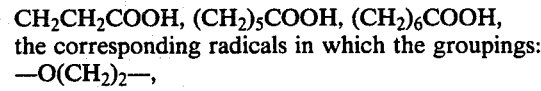

$CH_2CH_2COOH$, $(CH_2)_5COOH$, $(CH_2)_6COOH$,
the corresponding radicals in which the groupings:
—O(CH_2)_2—,

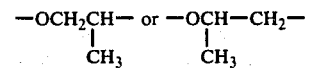

are present two or three times;

CH₂CH₂OCH₃, CH₂CH₂OC₂H₅, CH₂CH₂OC₃H₇, CH₂CH₂OC₄H₉, CH₂CH₂OC₆H₅, (CH₂)₃OCH₃, (CH₂)₃OC₂H₅, (CH₂)₃OC₄H₉,

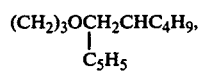

(CH₂)₃OC₃H₇,
(CH₂)₃OC₆H₁₃, (CH₂)₃OC₈H₁₇, (CH₂)₃O—, (CH₂)₃OCH₂C₆H₅, (CH₂)₃OC₂H₄C₆H₅, (CH₂)₃OC₆H₅,

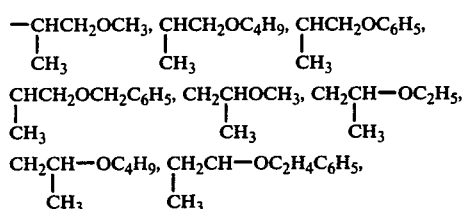

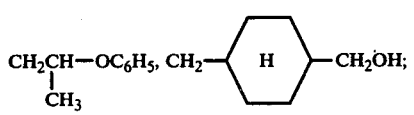

2. unsubstituted or substituted cycloalkyl and polycycloalkyl:

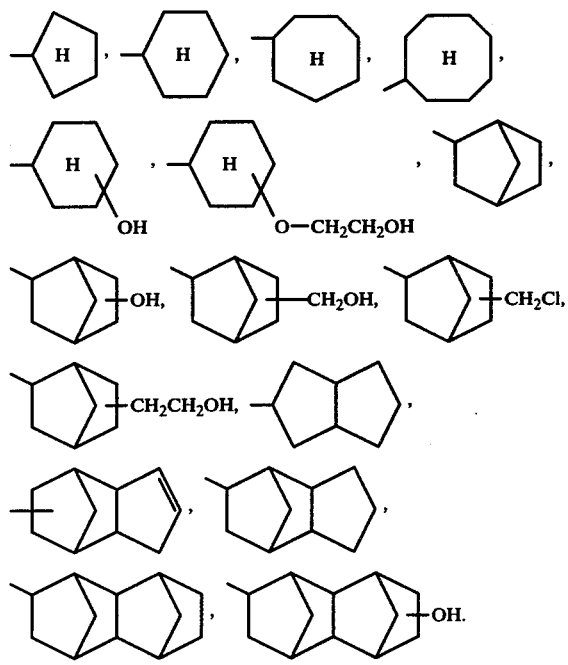

3. aralkyl:
CH₂C₆H₅, C₂H₄C₆H₅,

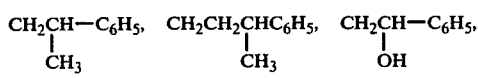

as well as C₆H₄CH₃ instead of C₆H₅;
4. unsubstituted or substituted phenyl; C₆H₅, C₆H₄CH₃, C₆H₃(CH₃)₂, C₆H₄OCH₃, C₆H₄OC₂H₅, C₆H₄OCH₂CH₂OH or C₆H₄Cl;

5. The radicals CH₂CH=CH₂, CH₂COOCH₃, (CH₂)₅COOCH₃, (CH₂)₅COOC₂H₅, (CH₂)₅COOC₄H₉,

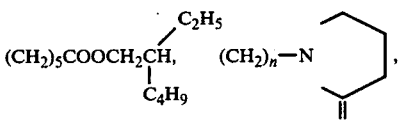

n being 2, 3, 4 or 6.
6. acyloxy: (CH₂)₂OCHO, (CH₂)₂OCOCH₃, (C₂H₄O)₂CHO, (C₂H₄O)₂COCH₃, (CH₂)₂OCOC₃H₇,

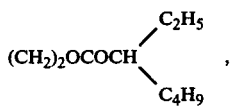

(CH₂)₂OCOC₆H₅, (CH₂)₂OCOC₆H₄CH₃,
(CH₂)₂OCOC₆H₄Cl, (CH₂)₂OCOC₁₀H₇,
(CH₂)₂OCONHCH₃, (CH₂)₂OCONHC₄H₉,

(CH₂)₂OCONHC₆H₅, (CH₂)₂OCONHC₆H₄Cl, (CH₂)₂OCONHC₆H₃Cl₂, and the corresponding radicals with (CH₂)₃; (CH₂)₄ or (CH₂)₆ in each case.
7. acyl:
CHO, CH₃CO, C₂H₅CO, C₃H₇CO,

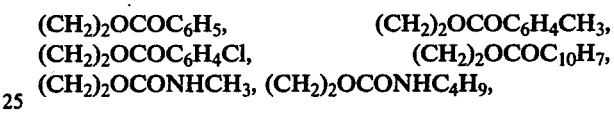

C₂H₅CO, CH₃C₆H₄CO, C₆H₅CH₂CO, C₆H₅OCH₂CO, CH₃SO₂, C₂H₅SO₂, C₆H₅SO₂ and CH₃C₆H₄SO₂.
Examples of preferred substituents are hydrogen, CH₃, C₂H₅, n— and i—C₃H₇, n— and i—C₄H₉, C₆H₁₃, CH₂CH₂OH, (CH₂)₃OH,

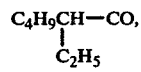

(CH₂)₂O(CH₂)₂OH, (CH₂)₃O(CH₂)₂OH,
(CH₂)₃O(CH₂)₄OH, (CH₂)₃O(CH₂)₆OH,

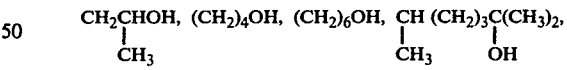

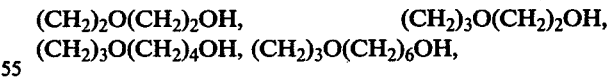

(CH₂)ₙ—N (n = 2, 3, 6),

CH₂CH₂OCH₃, CH₂CH₂OC₂H₅, CH₂CH₂OC₄H₉, (CH₂)₃OCH₃, (CH₂)₃OC₂H₅, (CH₂)₃OC₃H₇, (CH₂)₃OC₄H₉,

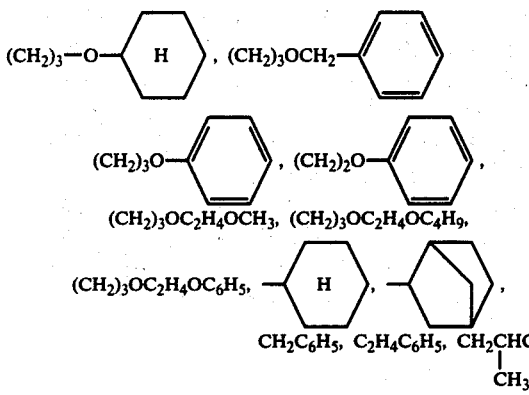

$C_6H_5$, $C_6H_4CH_3$, $C_6H_4OCH_3$, $C_6H_4OC_2H_4OH$ and $(CH_2)_5COOH$.

Examples of radicals $R^1$—N—$R^2$ and $R^3$—N—$R^4$ are: pyrrolidino, piperidino, morpholino, piperazino and hexamethyleneimino.

Dyes of the formula (I) may be prepared by reacting a diazo compound of an amine of the formula (II):

$$D-NH_2 \qquad (II)$$

with a coupling component of the formula (III):

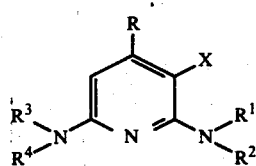 (III)

in which D, R, X, and $R^1$ to $R^4$ have the above meanings.

The amines are diazotized by the usual methods. Coupling is also carried out as usual in an aqueous medium, with or without the addition of a solvent, at a strongly acid to weakly acid pH.

The invention relates particularly to dye formulations which contain, in addition to the conventional dispersing agents water rentention agents and water, a dye of the formula (I) in which:

D is phenyl substituted by cyano, trifluoromethyl, methyl, fluoro, chloro, bromo, $C_1$ to $C_4$ alkylsulfonyl, phenylsulfonyl,

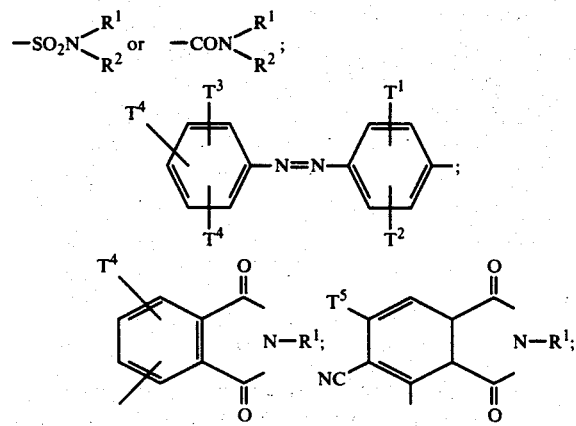

anthraquinonyl; anthraquinonyl substituted by methyl, chloro, bromo or carboxyl; or benzoisothiazolyl substituted by nitro, chloro or bromo;

R is hydrogen, $C_1$ to $C_3$ alkyl or phenyl;

X is cyano, carbamoyl or

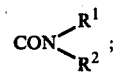

$R^1$ and $R^3$ independently of one another are hydrogen; $C_1$ to $C_8$ alkyl; $C_2$ to $C_8$ alkyl substituted by hydroxy, $C_1$ to $C_8$ alkoxy, phenoxy, tolyloxy, cyclohexyloxy, benzyloxy, β-phenylethoxy, carboxyl, carboxylic ester with a total of 2 to 9 carbon atoms, carboxylic acyloxy with a total of 1 to 11 carbon atoms, $C_1$ to $C_8$ alkylaminocarbonyloxy, benzoylaminocarbonyloxy, tolylaminocarbonyloxy, chlorophenylaminocarbonyloxy, dichlorophenylaminocarbonyloxy or pyrrolidonyl; cyclohexyl; norbornyl; phenyl-$C_1$ to $C_4$-alkyl; tolyl-$C_1$ to $C_4$-alkyl; β-phenyl-β-hydroxy-ethyl; phenyl; phenyl substituted by fluoro, chloro, bromo, methyl, trifluoromethyl, ethyl, methoxy, ethoxy or pyrrolidonyl; $CH_2CH_2OCH_2CH_2OH$; or $(CH_2)_3(OC_2H_4)_nOB$;

n is zero, 1 or 2;

B is hydrogen, $C_1$ to $C_4$ alkyl, cyclohexyl, benzyl, phenylethyl, phenyl or tolyl;

$R^2$ and $R^4$ independently of one another are hydrogen or $C_1$ to $C_4$ alkyl;

$R^1$ and $R^2$ together with the nitrogen are pyrrolidino, piperidino, morpholino or hexamethyleneimino;

$T^1$ is hydrogen, chloro, bromo or methyl;

$T^2$ is hydrogen or methyl;

$T^3$ is hydrogen,

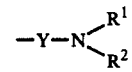

or $COOB^1$;

$B^1$ is hydrogen, $C_1$ to $C_8$ alkyl, phenyl-$C_1$ to $C_4$-alkyl or $(OC_2H_4)_nOB$;

Y is —$SO_2$— or —CO—;

$T^4$ is hydrogen or chloro; and $T^5$ is hydrogen, methyl or ethyl.

Dye formulations which contain a dye or dye mixture of the formula (Ia):

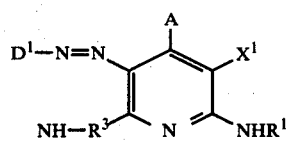 (Ia)

in which $D^1$ is a diazo component devoid of nitro groups of the benzene, phthalimide, naphthalimide, anthraquinone or azobenzene series or a nitrobenzoisothiazolyl radical;

A is hydrogen or $C_1$ to $C_3$ alkyl; and $X^1$ is cyano or carbamoyl; and $R^1$ and $R^3$ have the meanings given above, are particularly important industrially.

The substituents are conveniently chosen so that the molecule contains either in the diazo component or in the coupling component at least one aryl radical and preferably a phenyl radical.

We have special preference for A to be methyl and $X^1$ to be cyano and also for the combination A=H and $X^1$ = $CONH_2$.

Dyes are moreover preferred in which at least one of the radicals $R^1$ and $R^3$ contains an oxygen-containing amine radical, preferably the radical of one of the amines:

phenoxyethoxypropylamine, phenoxyethoxyethoxypropylamine, benzyloxypropylamine, phenylethoxypropylamine, butoxyethoxypropylamine, benzoyloxyethylamine, benzoyloxypropylamine, benzoyloxyethoxyethylamine, $H_2N(CH_2)_3O(CH_2)_4OCOC_6H_5$, $H_2N(CH_2)_2OCONHC_6H_5$, $H_2N(CH_2)_3OCONHC_6H_5$ and $H_2N(CH_2)OCONHC_6H_4Cl$ and the combination of one of these radicals with phenylamino or amino.

The radical $D^1$ may be derived for example specifically from the following amines: o-cyanoaniline, m-cyanoaniline, p-cyanoaniline, 2,4-dicyanoaniline, 2,4,6-tribromoaniline, 2,4-dichloroaniline, 2-cyano-4,6-dibromoaniline, 2,4-dicyano-6-bromoaniline, 4-cyano-2-chloroaniline, 1-amino-2-trifluoromethyl-4-chlorobenzene, 2-chloro-5-aminobenzonitrile, 2-amino-5-chlorobenzonitrile, 1-aminobenzene-4-methylsulfone, 1-amino-2,6-dibromobenzene-4-methylsulfone, 1-amino-2-chloro-4-methylsulfone, 1-amino-2,6-dichlorobenzene-4-methylsulfone, propyl 3,5-dichloroanthranilate, β-methoxyethyl 3,5-dibromoanthranilate, 4-aminoacetophenone, 4-aminobenzophenone, 2-aminobenzophenone, 2-aminodiphenylsulfone, 4-aminodiphenylsulfone, 3-aminophthal-β-hydroxyethylimide, 4-aminophthalic phenylimide or p-tolylimide, 3-amino-6-chlorophthalimide and its N-substitution products, 3-amino-4-cyano-5-methylphthalimide and 3-amino-4-cyano-5-ethylphthalimide and their N-substitution products, 1-amino-2-chloroanthraquinone, 1-amino-2-bromoanthraquinone, 1-amino-2,4-dibromoanthraquinone, 1-amino-2-acetyl-4-chloroanthraquinone, 1-aminoanthraquinone-6-carboxylic acid, its ethyl ester, the ethyl ester of 1-aminoanthraquinone-6-carboxylic acid, 1-amino-4-methoxyanthraquinone, 1-amino-4-hydroxyanthraquinone, 1-amino-2-chloro-4-p-toluidinoanthraquinone, 2-amino-1-chloroanthraquinone, 2-amino-3-chloroanthraquinone, 2-amino-3-bromoanthraquinone, 2-amino-1,3-dibromoanthraquinone, 2-amino-1-cyano-3-bromoanthraquinone, 1-aminobenzanthrone, 6-aminobenzanthrone, 7-aminobenzanthrone, 1-aminoanthraquinone, 2-aminoanthraquinone, 1-amino-4-chloroanthraquinone, 2,4-dicyano-3,5-dimethylaniline, the imide, methylimide, n-butylimide, 2-hydroxyethylimide, 3'-methoxypropylimide or phenylimide of 4-aminonaphthalic acid, 5-nitro-3-aminobenzoisothiazole-(2,1) or 5-nitro-7-bromo-3-aminobenzoisothiazole-(2,1).

Examples of suitable diazo components of the aminoazobenzene series are:
4-aminoazobenzene, 3-chloro-4-aminoazobenzene, 3-bromo-4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-chloro-2,5-dimethyl-4-aminoazobenzene, 4'-methoxy-2,5-dimethyl-5-aminoazobenzene, 3,5-dibromo-4-aminoazobenzene, 2,3'-dichloro-4-aminoazobenzene, 3-methoxy-4-aminoazobenzene, 2',3-dimethyl-5-bromo-4-azobenzene, 4'-amino-2',5'-dimethylazobenzene-4-sulfonic amide, 4'-amino-2',5'-dimethylazobenzene-4-sulfonic amide and the aminoazobenzenes of the formula:

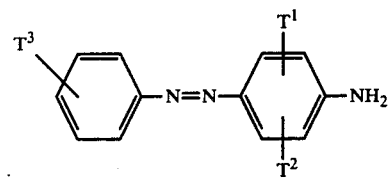

in which $T^1$ is hydrogen, chloro, bromo or methyl;
$T^2$ is hydrogen or methyl; and
$T^3$ is a radical of the formula

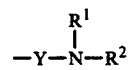

or $-COOB^1$ where Y is CO or $SO_2$ and $B^1$ is an alcohol radical and $R^1$ and $R^2$ have the meanings given above.

The dyes of the formula (I) may from their constitution be termed disperse dyes whose application for example to cotton is not as a rule possible. A process is described however in U.S. Pat. No. 3,706,525 which makes printing on cellulose and cellulosic textile material possible. Details given therein concerning process conditions are applicable to the dye formulations of the present invention. Other methods are specified in the commonly assigned copending application Ser. No. 691,496, filed June 1, 1976, by Hermann Schwab and Adolph Blum, now U.S. Pat. No. 4,049,377, according to which the dye formulations according to the invention may be applied. Printing processes are preferred. The above two patents are incorporated herein by reference.

The dye formulations according to the invention give dyeings and prints having excellent fastness properties among which wet fastnesses (particularly fastness to washing, water, perspiration and sea water) and in some cases lightfastness may be emphasized. In the case of prints for example no staining of any white ground present occurs in washing.

In the following Examples, which illustrate the invention, parts and percentages are by weight unless specified otherwise.

EXAMPLE 1

Cotton cloth is printed by a rotary screen printing method with an ink consisting of 10 parts of the dye of the formula:

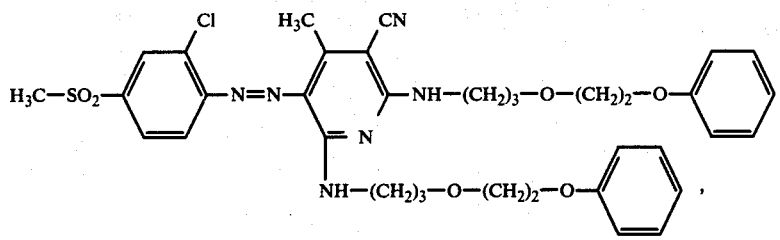

100 parts of polyethylene oxide of a molecular weight of 300 to 790 parts of a 3% alginate thickening and the print is dried at 100° C. The print is then treated for one minute at 200° C. with hot air, rinsed cold, soaped at the boil, again rinsed cold and dried. A light-fast and wash-fast yellow orange print is obtained on a white ground.

EXAMPLE 2

A cloth from a blend of polyester and cotton (ratio by weight 67:35) is printed with a paste consisting of 20 parts of the dye of the formula

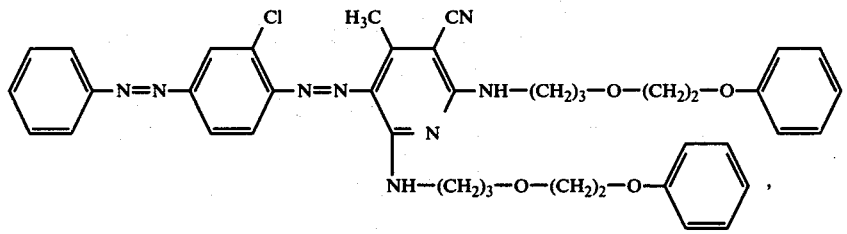

120 parts of the reaction product from polyethylene oxide having a molecular weight of 300 with boric acid in the molar ratio 3:1 and 860 parts of a 10% alginate thickening. The print is dried at 105° C. and treated for six minutes at 180° C. with superheated steam. The print is then rinsed with cold water, soaped at 80° C., again rinsed cold and dried.

A red print which is fast to light and washing is obtained on a white ground.

EXAMPLE 3

A cotton cloth is printed by the roller printing method with a print paste consisting of 15 parts of the dye of the formula:

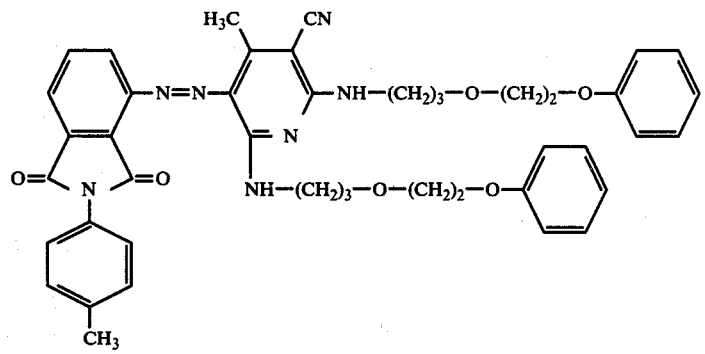

110 parts of polyethylene oxide of the molecular weight 350, 30 parts of the diethanolamide of oleic acid and 845 parts of a 10% alginate thickening. The print is dried at 100° C. and then fixed by a treatment with hot air for one minute at 195° C. The print is finished off as described in Example 1 and a fast organic print is obtained on a white ground.

EXAMPLE 4

Cloth of a blend of polyester and cellulose (ratio by weight 67:35) is printed on a screen printing machine with an ink consisting of 30 parts of the dye of the formula:

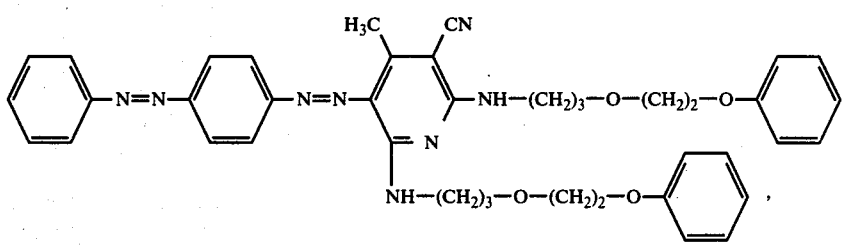

100 parts of the reaction product of polyethylene oxide of the molecular weight 300 with boric acid in the molar ratio 3:1, 30 parts of the diethanolamide of oleic acid and 840 parts of a 3% alginate thickening and the print is dried at 110° C. It is then treated for five minutes at 185° C. with superheated steam and finished off as described in Example 2. A fast scarlet print on a white ground is obtained.

EXAMPLE 5

Cotton cloth is padded on a padding mangle with a solution containing 20 parts of the dye of the formula:

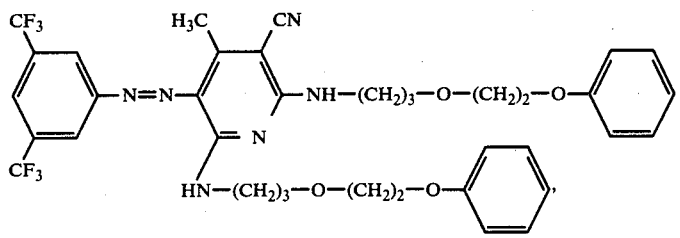

300 parts of a 3% alginate thickening, 550 parts of water and 130 parts of polyethylene oxide of the molecular weight 300. The cloth should take up 80% liquor. It is dried at 100° C. To fix the dye it is treated for five minutes with superheated steam at 190° C. The cloth is then rinsed cold, washed at 90° C. in a liquor containing 3 parts of the condensation product of a long chain alcohol with ethylene oxide to 997 parts of water.

A yellow dyeing is obtained.

Cloth of a blend of polyester and cotton in the ratio by weight 67:33 may be padded with the said solution instead of cotton cloth. A yellow dyeing is obtained in which the two phases are equal in tone. Fixation with hot air at 195° C. may also be carried out instead of the treatment with superheated steam.

EXAMPLE 6

Cotton cloth is padded on a padding mangle with a solution of 150 parts of polyethylene oxide in 850 parts of water so that the wet pickup is 80% and the padded cloth is dried at 100° C. The cloth treated in this way is printed by the rotary screen printing method with a color consisting of 30 parts of the dye of the formula:

and 970 parts of a 10% alginate thickening. After the print has been dried at 105° C. it is treated for seven minutes at 185° C. with superheated steam and finished off by rinsing and soaping as described in Example 1.

A fast red print on a white ground is obtained.

The dyes specified in the following Examples may be converted as follows into a commercial dye formulation:
30 parts of dye,
6 parts of dispersing agent,
10 parts of a water retention agent,
1 part of a disinfectant and
about 53 parts of water are ground in an agitator mill to a particle size of about 0.5 micron. A dispersion of the dye is thus obtained which is stable in storage.

EXAMPLE 7

20 parts of 4-aminoazobenzene is stirred overnight with 80 parts by volume of 5N hydrochloric acid. Then it is diluted with ice and water to a volume of 500 parts by volume at 10° C. 30 parts by volume of a 23% sodium nitrite solution is added and the whole is stirred for two hours at 15° C. The filtrate, in which excess nitrous acid has been removed in the conventional manner by adding sulfamic acid, is allowed to flow into a solution of 53 parts of 2,6-bis(phenoxyethoxypropylamino)-3-cyano-4-methylpyridine in 4000 parts by volume of dimethylformamide at 15° C. 150 parts by volume of a 50% aqueous sodium acetate solution is then added to this coupling mixture and the whole is stirred at 15° C. until coupling is completed. The dye formed is suction filtered, washed first with alcohol and then with hot water and dried at 90° C. A red powder is obtained which readily dissolves in dimethylformamide and polyethylene glycols with a yellowish red color and when printed in the form of these solutions or as an aqueous dispersion on cloth of polyester or cotton or a blend of the two types of fiber and aftertreated with hot air or superheated steam gives deep and clear scarlet hues.

EXAMPLE 8

35 parts of 3-chloro-4-aminoazobenzene is stirred overnight with 7 parts of an oxyethylated sperm oil alcohol containing about 23 ethylene oxide radicals and 120 parts by volume of 5N hydrochloric acid. A volume of 750 parts by volume and a temperature of 10° C. are set up with ice and water and 450 parts by volume of a 23% aqueous sodium nitrite solution is introduced. After stirring for two hours at 15° C. a small amount of insoluble matter is filtered off and nitrous acid is removed in the usual way by adding an aqueous solution of sulfamic acid.

The diazonium salt solution thus obtained is then allowed to flow at 10° C. into 385 parts by volume of an isobutanol solution containing 0.16 mole of 2,6-bis-(phenoxyethoxypropylamino)-3-cyano-4-methylpyridine. Complete coupling is achieved after stirring for several hours at 15° to 25° C. without adding the usual acid-binding agents. The dye formed is suction filtered, washed first with 100 parts by volume of isobutanol and then with 100 parts of hot water and then dried at 100° C.

The product which is in the form of a red powder may as an aqueous dispersion or dissolved in a polyethylene glycol be printed on cloth of polyester, cotton or a blend of both types of fiber and aftertreated with hot air or superheated steam. Deep and clear red hues of very good light and wet fastness properties are thus obtained.

EXAMPLE 9

The procedure described in Examle 8 is adpted but the coupling component used is 0.15 mole of the substance having the formula:

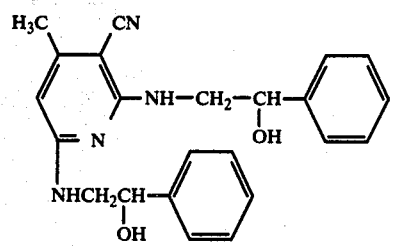

dissolved in 8000 parts by volume of dimethylformamide. The red powder obtained after isolation and drying dissolves in dimethylformamide and polyethylene glycols with a yellowish red color. Deep and clear scarlet hues with very good fastness properties are obtained on cloth of polyester, cotton or blends of the two.

Red hues having similar tinctorial properties are obtained in an analogous manner with the same diazo components and the following coupling components:

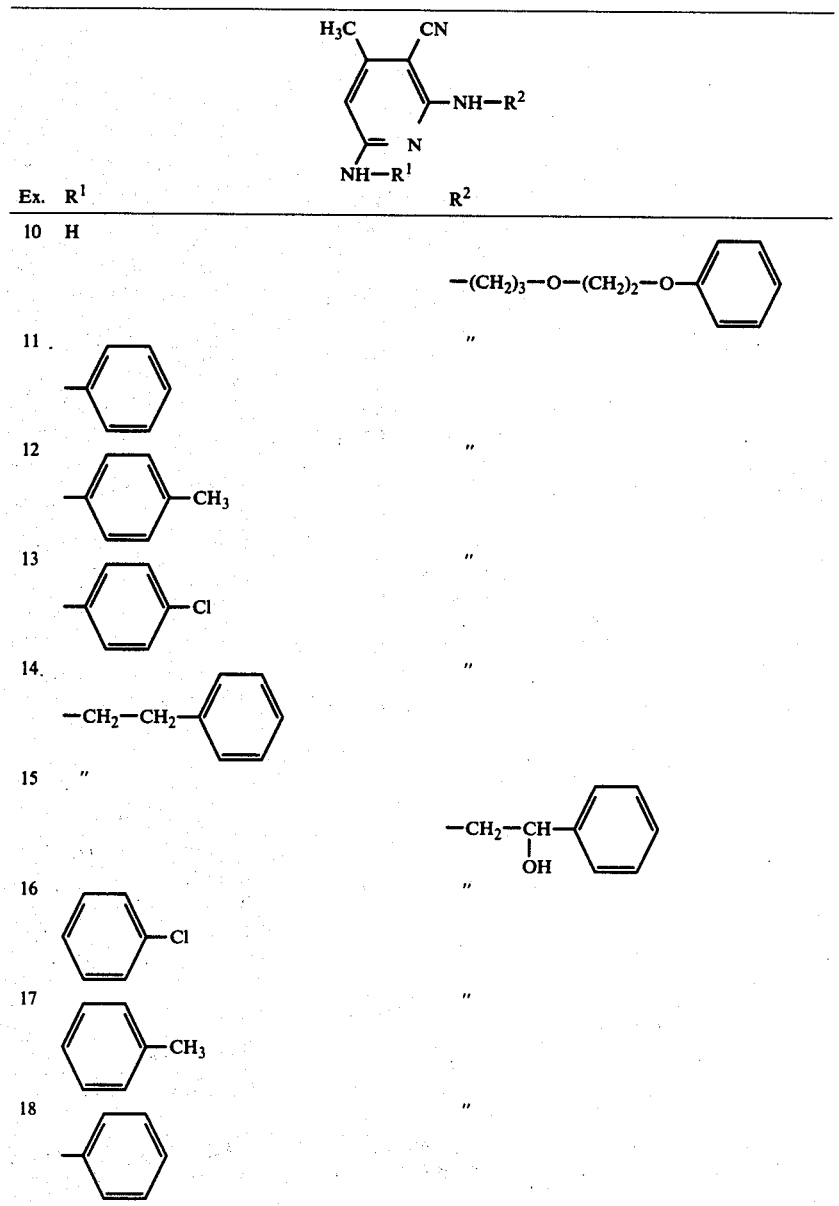

-continued

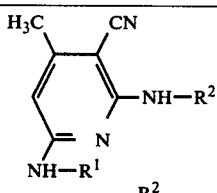

| Ex. | R¹ | R² |
|---|---|---|
| 19 | 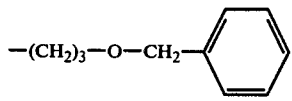 | 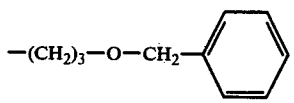 |
| 20 | 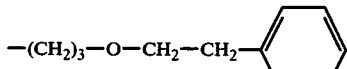 | 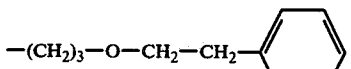 |
| 21 | 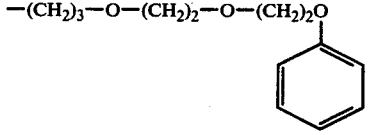 | 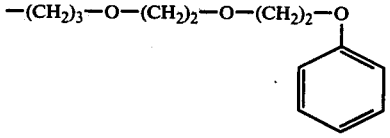 |
| 22 | H | " |

EXAMPLE 23

16 parts of o-trifluoromethylaniline is dissolved in 30 parts by volume of 10N hydrochloric acid and 200 parts of water. 200 parts of ice is added and then 30 parts by volume of a 23% aqueous solution of sodium nitrite is allowed to flow in below the surface. After stirring for half an hour at 0° to 5° C. the excess of nitrous acid is destroyed as usual by adding an aqueous solution of sulfamic acid.

The solution of the diazonium salt thus obtained is gradually added at 5° to 10° C. to a solution of 54 parts of bis-(phenoxyethoxypropylamino)-3-cyano-4-methylpyridine in 1000 parts by volume of dimethylformamide and then 32 parts by volume of a 50% aqueous sodium acetate solution is added. When coupling is over the yellow dye formed is suction filtered, washed first with alcohol and then with hot water and dried at 100° C. The yellow powder thus obtained dissolves in dimethylformamide or polyglycols with a pure yellow color and when printed on to cloth of cotton, polyester or blends of both and fixed gives deep and clear yellow hues with very good fastness properties.

The following dyes are obtained in a similar manner with the same coupling components:

| Ex. | Diazo component | Hue on cotton and polyester |
|---|---|---|
| 24 | m-trifluoromethylaniline | yellow |
| 25 | 4-chloro-2-trifluoromethylaniline | " |
| 26 | 2-cyanoaniline | " |
| 27 | 4-chloro-2-cyanoaniline | " |
| 28 | 2,4-dicyanoaniline | yellowish orange |
| 29 | 2-chloroaniline-4-methylsulfone | reddish yellow |
| 30 | 2-aminodiphenylsulfone | reddish yellow |
| 31 | 3-aminophthalic hydroxyethylimide | yellowish orange |

EXAMPLE 32

25.3 parts of the p-tolylimide of 3-aminophthalic acid is introduced at 15° to 25° C. into 60 parts of 96% sulfuric acid while stirring. The mixture is further stirred at the same temperature until complete solution has taken place. Then 32 parts (0.1 mole) of nitrosylsulfuric acid is allowed to flow in slowly at 0° to 5° C. and the diazotization mixture is stirred for another thirty minutes at 0° to 5° C. and then introduced into a mixture of 125 parts of ice and 25 parts of ice-water.

After the excess of nitrite has been destroyed with sulfamic acid the diazonium salt is stirred while 300 parts by volume of isobutanol and 110 parts by volume of a 10-molar solution of 2,6-bis-(phenoxyethoxypropylamino)-3-cyano-4-methylpyridine in isobutanol are introduced. After coupling is over the dye formed is suction filtered, washed first with isobutanol and then with hot water and dried at 100° C. The reddish powder thus obtained dissolves in polyglycols with a reddish yellow color and gives deep orange hues with very good fastness properties on polyester, cotton or blends of the two after having been printed and fixed.

The following dyes may be obtained by similar methods with the same coupling components:

| Ex. | Diazo components | Hue on polyester and cotton |
|---|---|---|
| 33 | 1-aminoanthraquinone | brown |
| 34 | 1-aminoanthraquinone-6-carboxylic acid | brown |
| 35 | 1-amino-2-chloroanthraquinone | brown |
| 36 | 1-amino-2-bromoanthraquinone | brown |
| 37 | 1-amino-2,4-dichloroanthraquinone | brown |
| 38 | 4-amino-3-methoxybenzanthrone | brown |
| 39 | 2-aminoanthraquinone | red |
| 40 | 2-amino-3-chloroanthraquinone | red |
| 41 | 2-amino-1-chloroanthraquinone | red |
| 42 | 2-amino-1-cyano-3-bromoanthraquinone | red |
| 43 | 2-amino-3-bromoanthraquinone | red |
| 44 | 1-aminobenzanthrone | reddish violet |
| 45 | 5-nitro-3-aminobenzoisothiazole-(2,3) | bluish violet |
| 46 | 5-nitro-2-aminothiazole | reddish violet |

The following dyes are obtainable according to the processes of the foregoing Examples:

| Ex. No. | Diazo components | Coupling components | Hue |
|---|---|---|---|
| 47 | 3-amino-N-phenylphthalimide | pyridine with CH₃, CO—NH—CH₂—CH₂—CH₂—O—CH₃, NH—CH₂—CH₂—CH₂—O—CH₃, NH—CH₂—CH₂—CH₂—O—CH₃ substituents | scarlet |
| 48 | 4-aminoazobenzene | " | red |
| 49 | 4-amino-3-chloroazobenzene | " | ruby |
| 50 | 4-amino-N-(p-tolyl)naphthalimide | " | reddish violet |
| 51 | 4-amino-2,2'-dimethylazobenzene | pyridine with CH₃, CN, NH—(CH₂)₃—O—(CH₂)₂—O—phenyl, NH—(CH₂)₃—O—(CH₂)₂—O—phenyl | red |
| 52 | 4-amino-2,3'-dimethylazobenzene | " | red |
| 53 | 2-amino-3,5-dibromobenzonitrile | " | orange |
| 54 | 4-amino-2,2'-dimethylazobenzene | pyridine with CH₃, CN, NH—(CH₂)₃—O—(CH₂)₂—O—phenyl, NH₂ | reddish orange |
| 55 | 4-amino-2,3'-dimethylazobenzene | " | reddish orange |
| 56 | 4-amino-3-bromoazobenzene | " | scarlet |

-continued

| 57 | 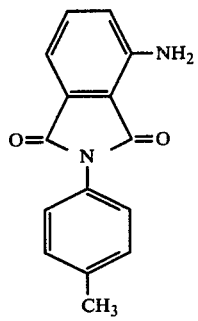 | " | yellowish orange |

| 58 | 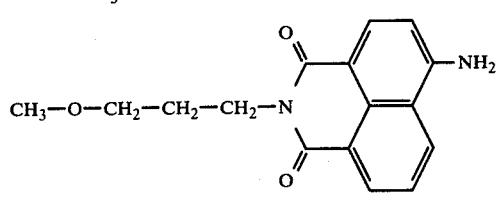 | " | red |

NH—CH$_2$CH$_2$CH$_2$OCH$_2$CH$_2$OC$_6$H$_5$

| Ex. No. | D | X | R$^1$ | R$^2$ | Hue |
|---|---|---|---|---|---|
| 59 | ![phenylazo-chlorotoluene] Ph-N=N-(3-Cl-4-methylphenyl) | CN | H | (CH$_2$)$_3$O(CH$_2$)$_2$OC$_6$H$_5$ | red |
| 60 | " | CN | C$_2$H$_5$ | " | red |
| 61 | " | CN | C$_3$H$_{7(n)}$ | " | red |
| 62 | ![phenylsulfonyl-tolyl] Ph-SO$_2$-(o-tolyl) | CN | C$_6$H$_5$ | " | golden yellow |
| 63 | " | CONH$_2$ | H | (CH$_2$)$_3$OCH$_3$ | orange |
| 64 | ![phenylazo-tolyl] Ph-N=N-(p-tolyl) | " | H | " | scarlet |
| 65 | ![phenylazo-chlorotoluene] Ph-N=N-(3-Cl-4-methylphenyl) | " | H | " | red |
| 66 | ![phenylazo-chloromethyltoluene] Ph-N=N-(2-Cl-4,5-dimethylphenyl) | CN | CH$_3$ | " | red |
| 67 | " | CONH$_2$ | H | " | red |
| 68 | ![chlorophenylazo-chloromethyltoluene] (4-Cl-Ph)-N=N-(2-Cl-4,5-dimethylphenyl) | CN | CH$_3$ | (CH$_2$)$_3$O(CH$_2$)$_2$OC$_6$H$_5$ | red |
| 69 | " | CN | H | " | red |
| 70 | " | CN | CH$_3$ | CH$_2$CH$_2$OCH$_3$ | red |
| 71 | " | CONH$_2$ | H | " | bluish red |

-continued

| 72 | [4-cyanophenyl-N=N-(2,5-dimethyl-4-yl)phenyl] | CN | CH₃ | (CH₂)₃O(CH₂)₂OC₆H₅ | bluish red |

Structure:

$$\text{D}-N=N-\underset{\underset{NH-CH_2CH_2CH_2OCH_2CH_2OC_6H_5}{\overset{|}{N}}}{\overset{\overset{H_3C}{|}}{C}}=\overset{CN}{C}-NH-CH_2CH_2CH_2OCH_2C_6H_5$$

| Ex. No. | D | Hue |
|---|---|---|
| 73 | C₆H₅–N=N–C₆H₄– | scarlet |
| 74 | (2-CH₃-C₆H₄)–N=N–(3-CH₃-C₆H₃)– | scarlet |
| 75 | (3-CH₃-C₆H₄)–N=N–(2-CH₃-C₆H₃)– | scarlet |
| 76 | C₆H₅–N=N–(3-Cl-C₆H₃)– | red |
| 77 | C₆H₅–N=N–(3-Br-C₆H₃)– | red |
| 78 | (4-Cl-C₆H₄)–N=N–(2,5-diCH₃-C₆H₂)– | red |
| 79 | (2-Cl-C₆H₄)–N=N–(2,5-diCH₃-C₆H₂)– | red |
| 80 | (3-Cl-C₆H₄)–N=N–(2,5-diCH₃-C₆H₂)– | red |
| 81 | (2-CH₃-C₆H₄)–N=N–(3-CH₃-5-Cl-C₆H₂)– | red |

-continued
| Ex. No. | D | Hue |
|---|---|---|
| 82 | 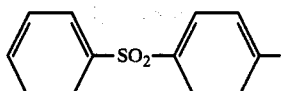 | orange |
| 83 | 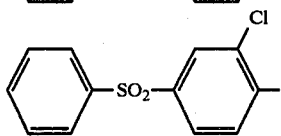 | orange |
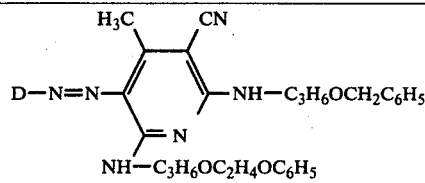
| Ex. No. | D | Hue |
|---|---|---|
| 84 | 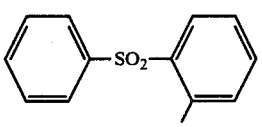 | golden yellow |
| 85 | 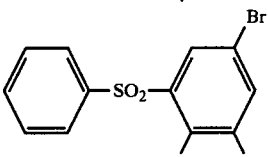 | golden yellow |
| 86 | 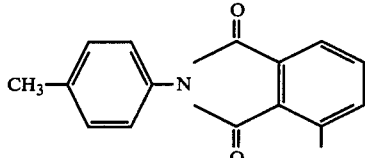 | orange |
| 87 | 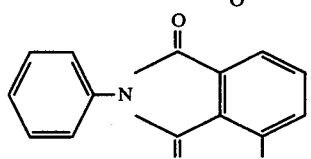 | orange |
| 88 | 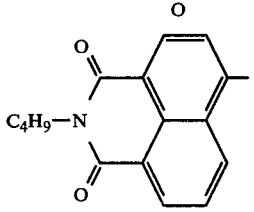 | ruby |
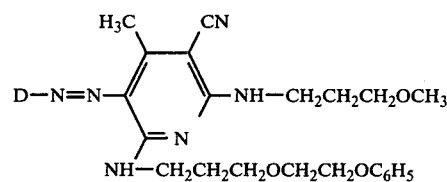
| Ex. No. | D | Hue |
|---|---|---|
| 89 | 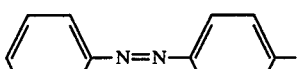 | scarlet |
| 90 | 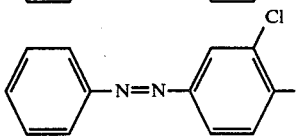 | red |

| | | |
|---|---|---|
| 91 | 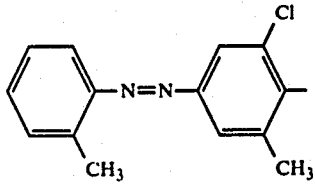 | red |
| 92 | 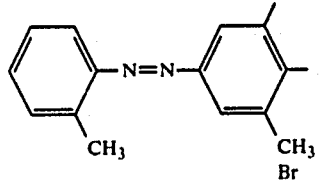 | red |
| 93 | 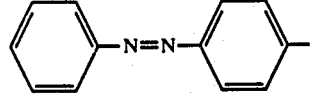 | red |
| 94 | 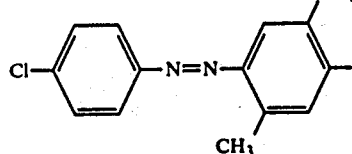 | red |
| 95 | 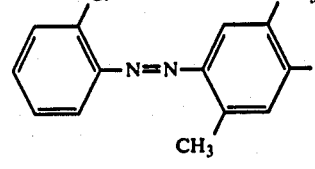 | red |
| 96 | 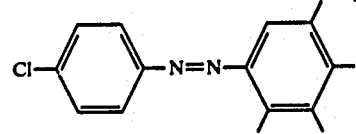 | red |
| 97 | 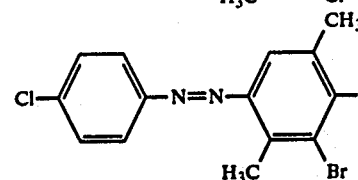 | red |
| 98 | 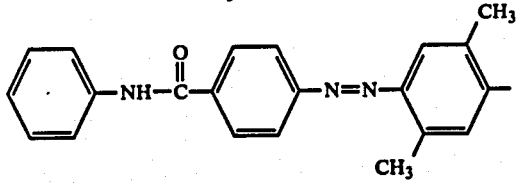 | red |
| 99 | 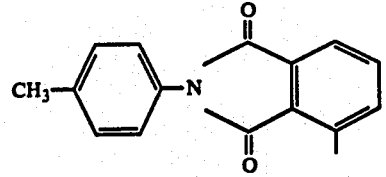 | orange |
| 100 | 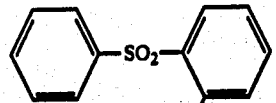 | golden yellow |
| 101 | 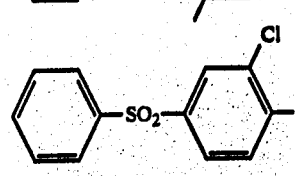 | orange |

-continued
| 102 | 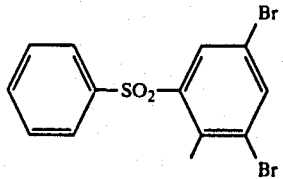 | | orange |
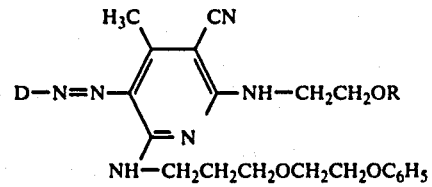
| Ex. No. | D | R | Hue |
|---|---|---|---|
| 103 | 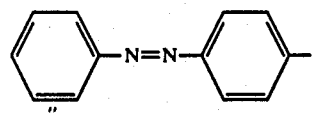 | H | reddish orange |
| 104 | " | CH$_3$ | reddish orange |
| 105 | " | COC$_6$H$_5$ | reddish orange |
| 106 | 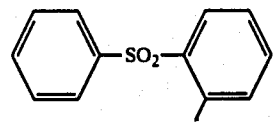 | " | golden yellow |
| 107 | 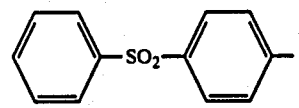 | " | golden yellow |
| 108 | 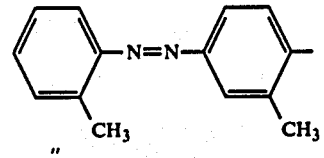 | " | reddish orange |
| 109 | " | H | reddish orange |
| 110 | 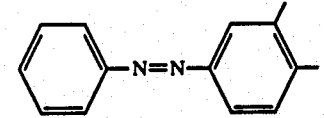 | H | red |
| 111 | 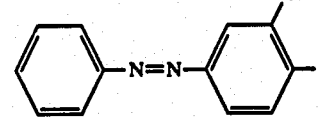 | COC$_6$H$_5$ | red |
| 112 | " | CH$_2$CH$_2$O$\overset{O}{\overset{\|}{C}}$C$_6$H$_5$ | red |
| 113 | " | CH$_3$ | red |
| 114 | " | C$_2$H$_5$ | red |
| 115 | 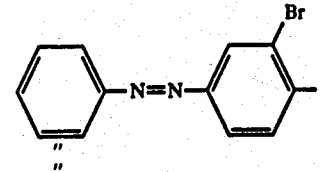 | | |
| 116 | " | CH$_3$ | red |
| 117 | " | H | red |
| 118 | 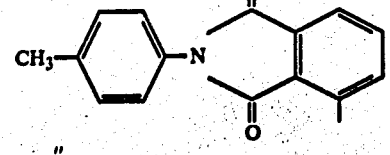 | H | yellowish orange |
| 119 | " | CH$_3$ | yellowish orange |
| 120 | " | C$_2$H$_5$ | yellowish orange |

-continued
| | | | |
|---|---|---|---|
| 121 | 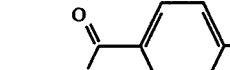 | C₂H₅ | red |
| 122 | " | CH₃ | red |
| 123 | " | H | red |
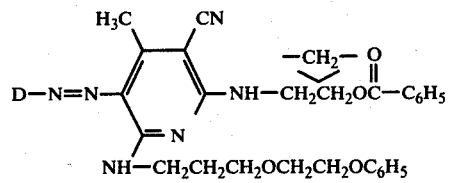
| Ex. No. | D | Hue |
|---|---|---|
| 124 | ![phenyl-SO₂-phenyl] | golden yellow |
| 125 | ![phenyl-SO₂-(3-Cl)phenyl] | orange |
| 126 | ![phenyl-SO₂-(2-)phenyl] | golden yellow |
| 127 | ![phenyl-N=N-phenyl] | reddish orange |
| 128 | ![phenyl-N=N-(3-Cl)phenyl] | red |
| 129 | ![phenyl-N=N-(3-Br)phenyl] | red |
| 130 | ![2-CH₃-phenyl-N=N-3-CH₃-phenyl] | reddish orange |
| 131 | ![3-CH₃-phenyl-N=N-3-CH₃-phenyl] | reddish orange |
| 132 | ![4-Cl-phenyl-N=N-2,4-(CH₃)₂-phenyl] | red |

-continued
| Ex. No. | Structure | Hue |
|---|---|---|
| 133 | 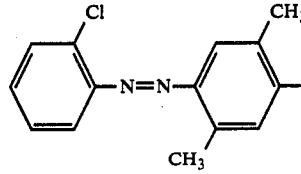 | red |
| 134 | 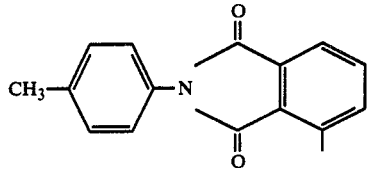 | orange |
| 135 | 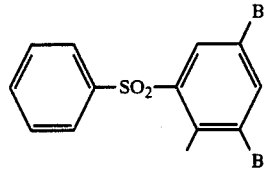 | orange |
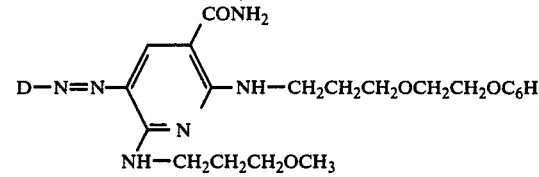
| Ex. No. | D | Hue |
|---|---|---|
| 136 | 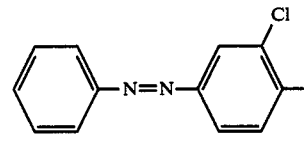 | bluish red |
| 137 | 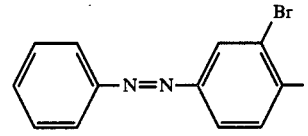 | bluish red |
| 138 | 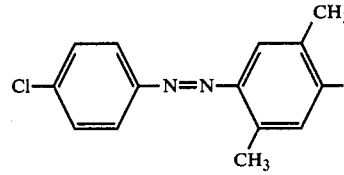 | Bordeaux |
| 139 | 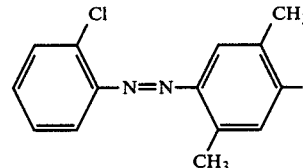 | Bordeaux |
| 140 | 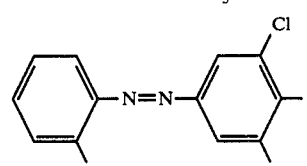 | bluish red |
| 141 | 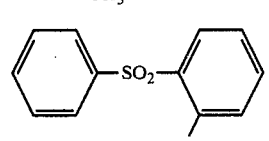 | orange |

-continued
| | | |
|---|---|---|
| 142 | 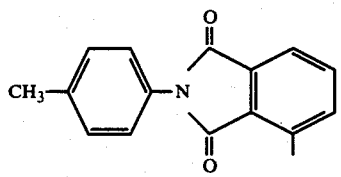 | orange |
| 143 | 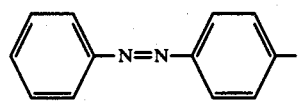 | reddish orange |
| 144 | 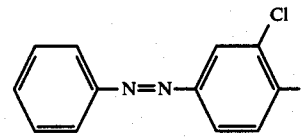 | red |
| 145 | 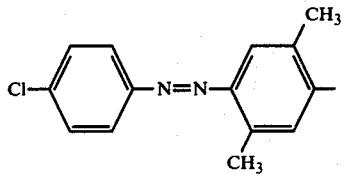 | red |
| 146 | 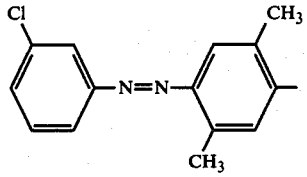 | red |
| 147 | 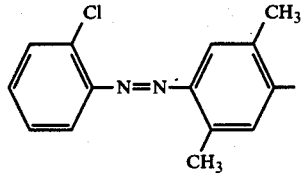 | red |
| 148 | 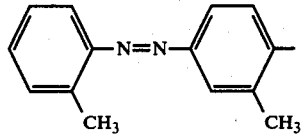 | reddish orange |
| 149 | 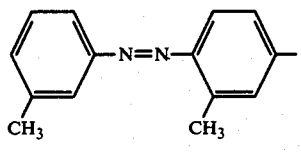 | reddish orange |
| 150 | 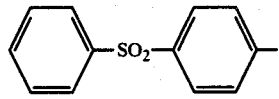 | golden yellow |
| 151 | 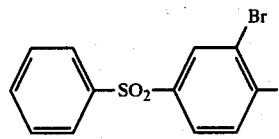 | golden yellow |
| 152 | 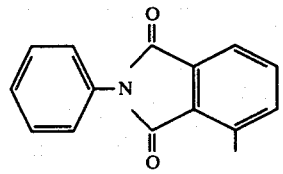 | golden yellow |

-continued
| 153 | 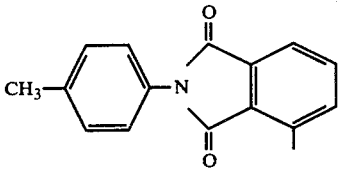 | golden yellow |
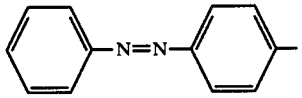
| Ex. No. | D | Hue |
|---|---|---|
| 154 | 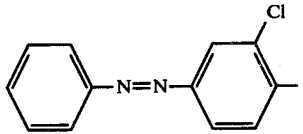 | reddish orange |
| 155 | 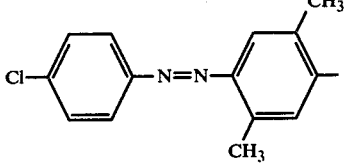 | red |
| 156 | 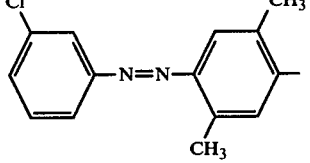 | red |
| 157 | 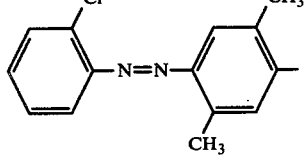 | red |
| 158 | 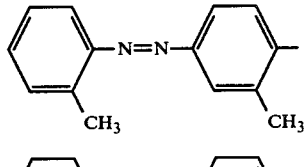 | red |
| 159 | 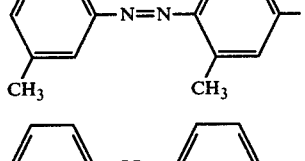 | orange |
| 160 |  | orange |
| 161 | 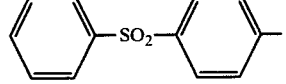 | golden yellow |
| 162 |  | golden yellow |

-continued
| | | |
|---|---|---|
| 163 | 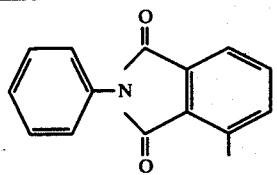 | golden yellow |
| 164 | 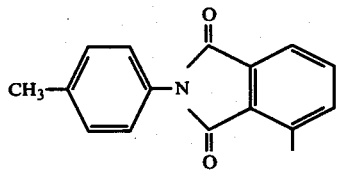 | golden yellow |
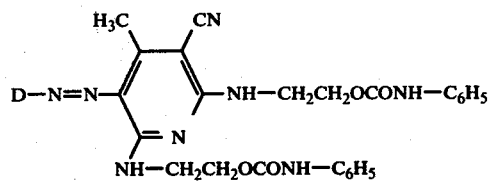
| Ex. No. | D | Hue |
|---|---|---|
| 165 | 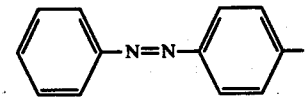 | reddish orange |
| 166 | 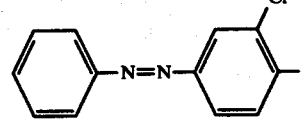 | red |
| 167 | 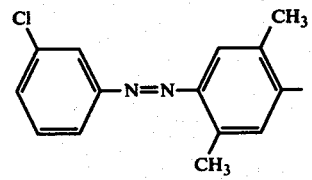 | red |
| 168 | 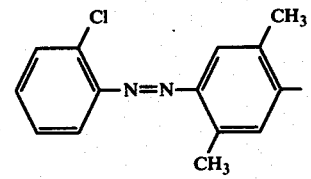 | red |
| 169 | 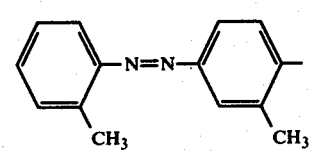 | red |
| 170 | 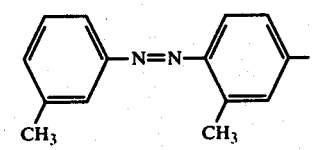 | reddish orange |
| 171 | 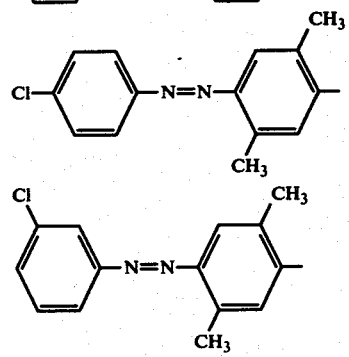 | reddish orange |
| 172 | 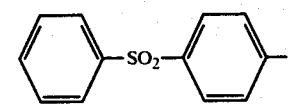 | golden yellow |

-continued
| | | |
|---|---|---|
| 173 | 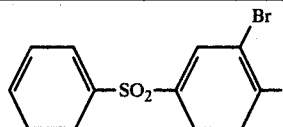 | golden yellow |
| 174 | 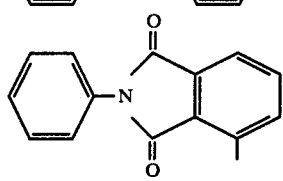 | golden yellow |
| 175 | 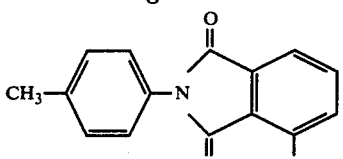 | golden yellow |
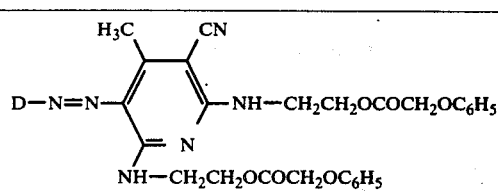
| Ex. No. | D | Hue |
|---|---|---|
| 176 | 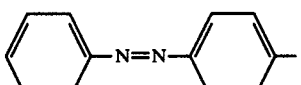 | reddish orange |
| 177 | 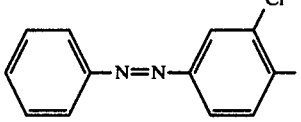 | red |
| 178 | 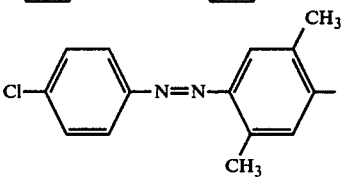 | red |
| 179 | 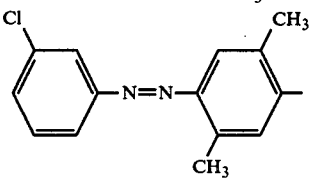 | red |
| 180 | 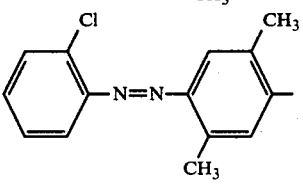 | red |
| 181 | 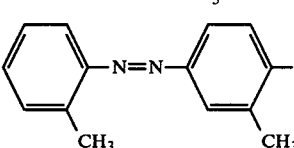 | reddish orange |
| 182 | 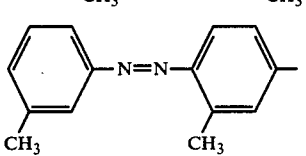 | reddish orange |

-continued
| | | Hue |
|---|---|---|
| 183 | 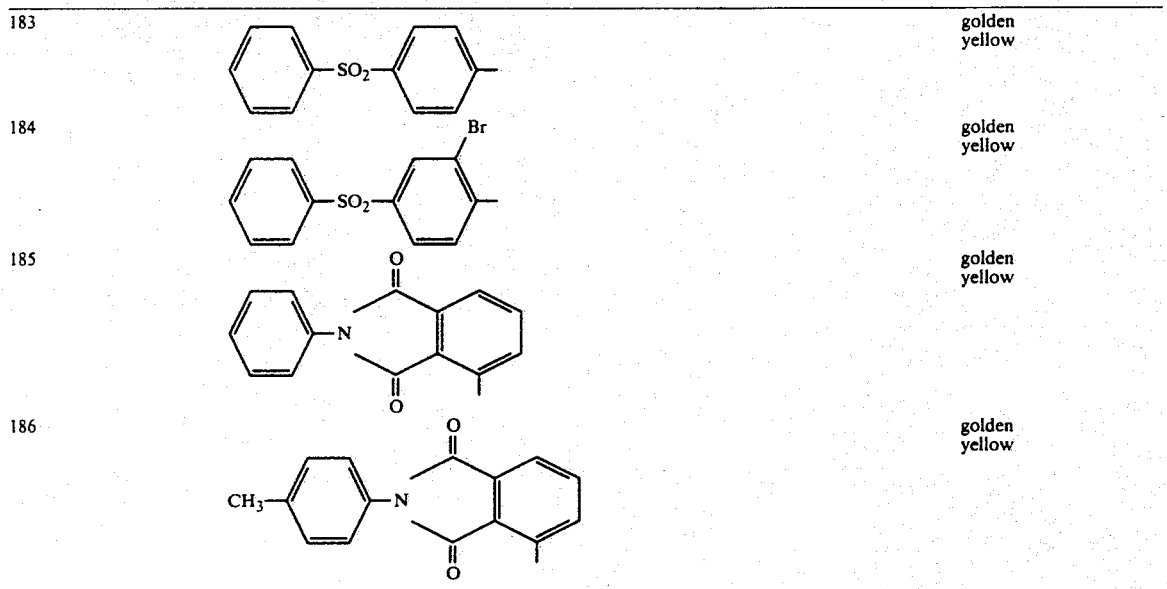 | golden yellow |
| 184 | | golden yellow |
| 185 | | golden yellow |
| 186 | | golden yellow |
Coupling components / Diazo component
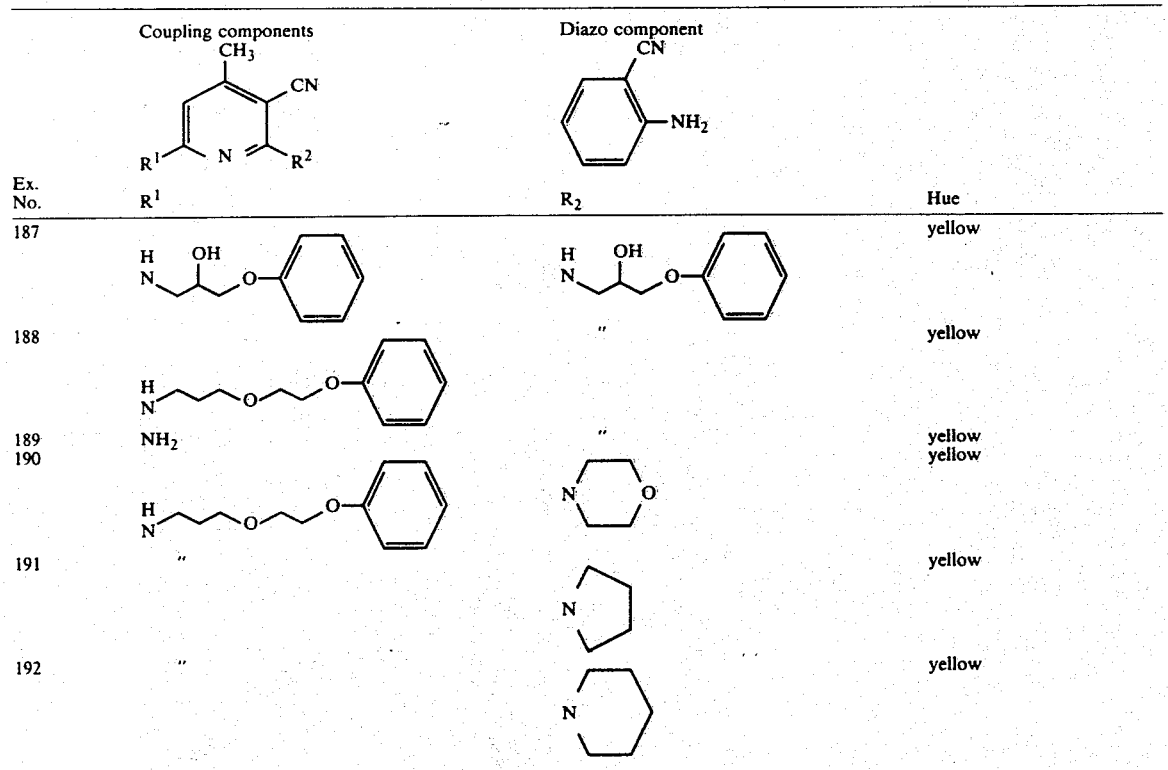
| Ex. No. | R$^1$ | R$^2$ | Hue |
|---|---|---|---|
| 187 | | | yellow |
| 188 | | " | yellow |
| 189 | NH$_2$ | " | yellow |
| 190 | | | yellow |
| 191 | " | | yellow |
| 192 | " | | yellow |
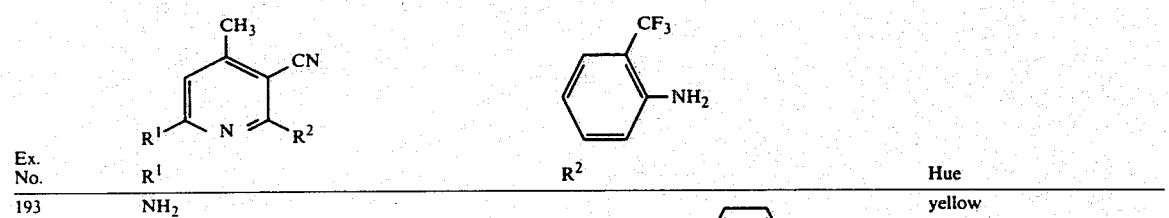
| Ex. No. | R$^1$ | R$^2$ | Hue |
|---|---|---|---|
| 193 | NH$_2$ | | yellow |
Coupling components / Diazo component

-continued
| Ex. No. | R¹ | R² | Hue |
|---|---|---|---|
| 194 | 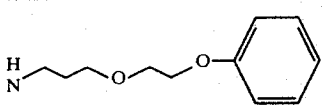 | 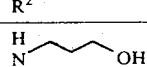 | yellow |
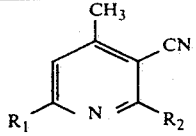
| Ex. No. | R¹ | R² | Hue |
|---|---|---|---|
| 195 | 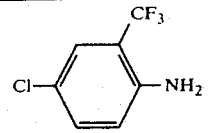 | 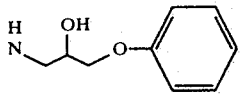 | golden yellow |
| 196 | 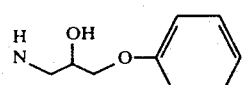 | 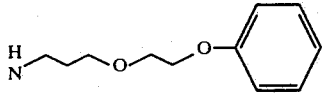 | orange |
| 197 | " |  | orange |
| 198 | " |  | orange |
Coupling components   Diazo component 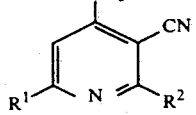
| Ex. No. | R¹ | R² | Hue |
|---|---|---|---|
| 199 | 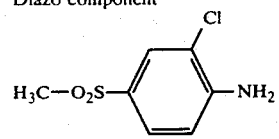 | 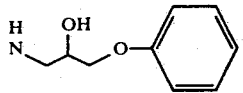 | golden yellow |
| 200 | 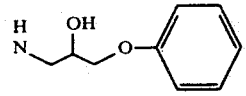 | 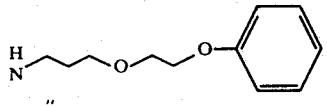 | orange |
| 201 | " |  | orange |
Coupling components   Diazo component 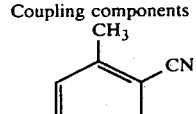
| Ex. No. | R¹ | R² | Hue |
|---|---|---|---|
| 202 | 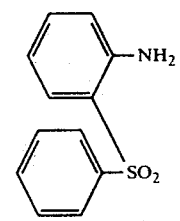 | 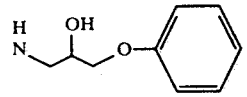 | golden yellow |
| 203 | NH₂ | " | orange |
| 204 | 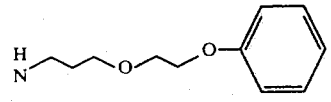 |  | orange |

-continued

| Ex. No. | | | Hue |
|---|---|---|---|
| 205 | " | 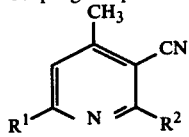 | orange |
| 206 | " | (morpholine structure) | orange |
| 207 | " | H N—CH₂CH₂CH₂—OH | golden yellow |
| 208 | " | H N—CH₂CH₂—OH | golden yellow |

Coupling components 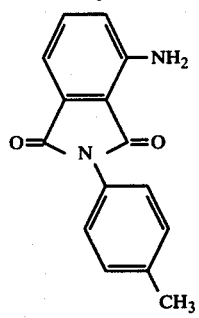 Diazo component (3-amino-N-(4-methylphenyl)phthalimide structure)

| Ex. No. | R¹ | R² | Hue |
|---|---|---|---|
| 209 | H N—CH₂CH₂CH₂—O—CH₂CH₂—O—C₆H₅ | H N—CH₂CH₂CH₂—OH | orange |
| 210 | " | H N—cyclohexyl | orange |
| 211 | " | H N—CH₂—C₆H₅ | orange |
| 212 | " | H N—bicyclic | orange |
| 213 | " | H N—CH₂CH₂—OH | orange |

Coupling components 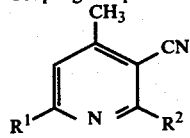 Diazo component 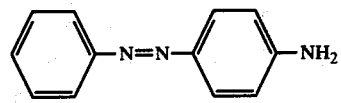

| Ex. No. | R¹ | R² | Hue |
|---|---|---|---|
| 214 | H N—CH₂CH₂CH₂—O—CH₂CH₂—O—C₆H₅ | H N—CH₂—CH(OH)—CH₂—O—C₆H₅ | reddish orange |
| 215 | H N—CH₂—CH(OH)—CH₂—O—C₆H₅ | H N—CH₂—CH(OH)—CH₂—O—C₆H₅ | " |
| 216 | H N—CH₂CH₂CH₂—O—CH₂CH₂—O—C₆H₅ | (morpholine) | " |
| 217 | " | (pyrrolidine) | red |

-continued
| Ex. No. | | | Hue |
|---|---|---|---|
| 218 | " |  | " |
| 219 | NH₂ | 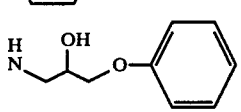 | orange |
| | Coupling components 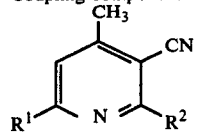 | Diazo component 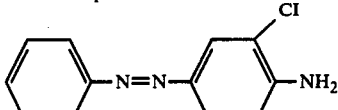 | |
|---|---|---|---|
| Ex. No. | R¹ | R² | Hue |
| 220 | 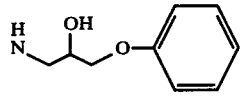 | 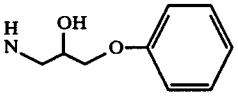 | red |
| 221 | 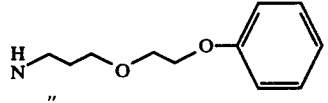 | " | " |
| 222 | " | 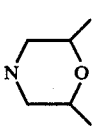 | " |
| 223 | NH₂ | 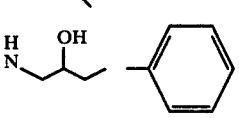 | " |
| 224 | 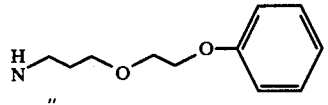 |  | " |
| 225 | " | 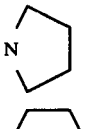 | " |
| 226 | " | 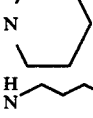 | " |
| 227 | " | 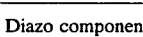 | " |
| | Coupling components 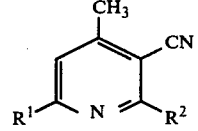 | Diazo component 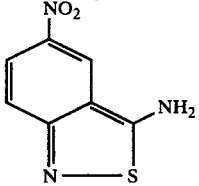 | |
|---|---|---|---|
| Ex. No. | R¹ | R² | Hue |
| 228 | 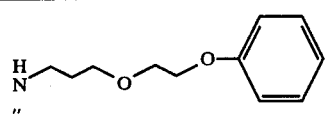 | 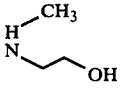 | Bluish violet |
| 229 | " | 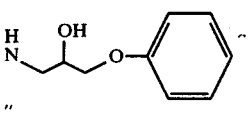 | " |
| 230 | 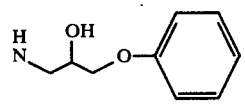 | " | " |

-continued

| Ex. No. | R | Coupling component | Hue |
|---|---|---|---|
| 231 | NH₂ | " | violet |
| 232 | (phenoxy-ethoxy-propylamine) | morpholine | bluish violet |
| 233 | " | N(CH₃)CH₂CH₂OH | blue |
| 234 | " | (pyrrolidine) | " |
| 235 | " | (piperidine) | " |

Ex.No.236

[Structure: thiazole-C₆H₅ with C₆H₅, N=N linked to pyridine ring with CH₃, CN, NHC₃H₆OC₂H₄OC₆H₅, NH—C₃H₆OC₂H₄OC₆H₅] — red Structure for Ex. 237–257:

R¹—C₆H₄—N=N—C₆H₂(R²)(R³)—N=N—[pyridine ring with CH₃, CN, NH=R⁴, NH—R⁵]

| Ex. No. | R¹ | R² | R³ | R⁴ | R⁵ | Hue |
|---|---|---|---|---|---|---|
| 237 | C₆H₅—OCH₂—CH₂—OCH₂—CH₂—CH₂NH—C(O)— | CH₃ | CH₃ | CH₂CH₂OCH₃ | CH₂CH₂OCH₃ | red |
| 238 | " | " | " | CH₂CH₂CH₂OCH₃ | CH₂CH₂CH₂OCH₃ | " |
| 239 | " | " | " | " | C₆H₅ | " |
| 240 | C₆H₅—O—CH₂CH₂OCH₂CH₂CH₂NHSO₂— | " | " | " | " | " |
| 241 | C₆H₅—CH₂—CH₂—O—C(O)— | " | " | " | " | " |
| 242 | " | " | " | " | CH₂CH₂CH₂OCH₃ | " |
| 243 | " | H | " | " | " | " |
| 244 | " | Cl | H | " | " | " |
| 245 | " | CH₃ | CH₃ | " | C₆H₅ | " |
| 246 | CH₃—O—CH₂—CH₂—O—C(O)— | " | " | " | (CH₂)₃O(CH₂)₂OC₆H₅ | " |
| 247 | " | " | " | " | " | " |
| 248 | C₆H₅—CH₂—CH₂—NH—C(O)— | " | " | (CH₂)₃O(CH₂O(C₆H₅) | " | " |
| 249 | (C₂H₅)₂N—C(O)— | " | " | " | " | " |
| 250 | (C₄H₉)₂N—SO₂— | " | " | " | " | " |
| 251 | morpholine-N—C(O)— | " | " | (CH₂)₃OCH₃ | " | " |
| 252 | H | Cl | H | (CH₂)₅—COOH | " | " |
| 253 | HOOC | CH₃ | CH₃ | (CH₂)₃O(CH₂)₂OC₆H₅ | " | " |
| 254 | H | H | H | (CH₂)₅—COOH | " | orange |
| 255 | H | CH₃ | CH₃ | " | " | " |
| 256 | H | Cl | H | (CH₂)₃O(CH₂)₂OC₆H₅ | COCH₃ | scarlet |
| 257 | " | " | " | " | SO₂CH₃ | " |

Coupling component

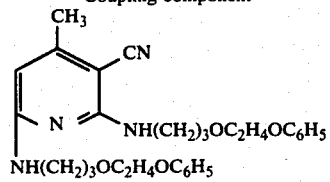

[pyridine with CH₃, CN, NH(CH₂)₃OC₂H₄OC₆H₅, NH(CH₂)₃OC₂H₄OC₆H₅]

-continued

| Ex. No. | Diazo components | Hue |
|---|---|---|
| 258 | [structure] | yellow |
| 259 | [structure] | orange |
| 260 | [structure] | " |
| 261 | [structure] | scarlet |
| 262 | [structure] | " |
| 263 | [structure] | " |
| 264 | [structure] | bluish red |
| 265 | [structure] | " |
| 266 | [structure] | reddish violet |

-continued

| 267 | 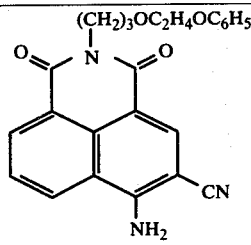 | | | | " |

| 268 | 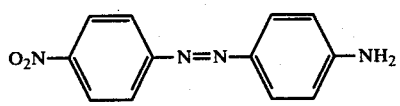 | | | | ruby |

| 269 | trichloroaniline | | | | yellow |
| 270 | tribromoaniline | | | | yellow |

Coupling component

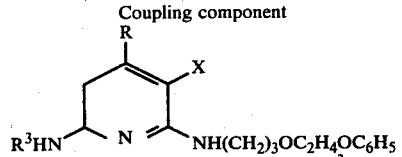

| Ex. No. | Diazo components | R | X | R³ | Hue |
| --- | --- | --- | --- | --- | --- |
| 271 | 1-aminoanthraquinone | $CH_3$ | CN | H | brown |
| 272 | " | H | CN | H | brown |
| 273 | " | H | $CONH_2$ | H | reddish brown |
| 274 | " | $CH_3$ | CN | $C_6H_5$ | brown |
| 275 | " | H | CN | $C_6H_5$ | brown |
| 276 | " | H | $CONH_2$ | $C_6H_5$ | reddish brown |
| 277 | " | $CH_3$ | CN | $C_6H_4CH_3(p)$ | brown |
| 278 | 1-amino-2-chloroanthraquinone | $CH_3$ | CN | H | brown |
| 279 | " | $CH_3$ | CN | $C_6H_5$ | brown |
| 280 | " | $CH_3$ | CN | $C_6H_4CH_3(p)$ | brown |
| 281 | " | H | CN | $C_6H_5$ | brown |
| 282 | " | H | $CONH_2$ | $C_6H_5$ | reddish brown |
| 283 | 1-amino-2-methylanthraquinone | $CH_3$ | CN | H | brown |
| 264 | " | $CH_3$ | CN | $C_6H_5$ | brown |
| 285 | 3-amino-5-nitro-benzoisothiazole-(2,1) | H | CN | H | violet |
| 286 | " | H | $CONH_2$ | H | navy blue |
| 287 | " | H | $CONH_2$ | $C_6H_5$ | blue |
| 288 | 3-amino-5-nitro-7-bromo-benzoisothiazole-(2,1) | H | $CONH_2$ | $C_6H_5$ | blue |
| 289 | " | H | $CONH_2$ | H | navy blue |
| 290 | " | H | CN | H | bluish violet |
| 291 | 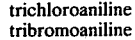 | $CH_3$ | CN | H | orange |
| 292 | " | $CH_3$ | CN | $C_6H_5$ | orange |
| 293 | " | H | CN | H | orange |
| 294 | " | H | $CONH_2$ | H | scarlet |
| 295 | " | H | $CONH_2$ | $C_6H_5$ | scarlet |
| 296 | 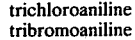 | $CH_3$ | CN | $C_6H_5$ | orange |
| 297 | " | H | CN | $C_6H_5$ | orange |
| 298 | " | H | $CONH_2$ | $C_6H_5$ | scarlet |
| 299 | " | H | $CONH_2$ | H | orange |
| 300 | | H | CN | H | red |
| 301 | " | H | CN | $C_6H_5$ | red |
| 302 | " | H | $CONH_2$ | $C_6H_5$ | ruby |
| 303 | " | H | $CONH_2$ | H | ruby |
| 304 | " | H | CN | $(CH_2)_3OC_2H_4OC_6H_5$ | red |

-continued

| 305 | ![H5C6-N=N-(3-Br-4-Me-phenyl)] | H | CONH2 | H | ruby |
|---|---|---|---|---|---|
| 306 | " | H | CN | H | red |
| 307 | " | H | CN | $C_6H_5$ | red |
| 308 | " | $CH_3$ | CN | $(CH_2)_3OC_2H_4OC_6$ | red |
| 309 | " | $CH_3$ | CN | H | orange |
| 310 | $H_5C_6-N=N-$(p-phenyl) | H | CN | H | orange |
| 311 | " | H | CONH2 | H | scarlet |

Coupling components

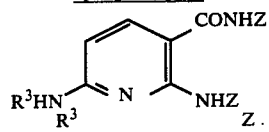

| Ex. No. | Diazo components | $R^3$ | Z | Hue |
|---|---|---|---|---|
| 312 | 2-CN-aniline | H | $(CH_2)_3OC_2H_4OC_6H_5$ | orange |
| 313 | " | $C_6H_5$ | " | orange |
| 314 | 2-CF3-aniline | H | " | orange |
| 315 | 3,5-bis-CF3-aniline | H | " | orange |
| 316 | 3-Cl-4-NH2-$H_3CO_2S$-phenyl | H | " | scarlet |
| 317 | 2-SO2C6H5-aniline | H | " | scarlet |
| 318 | 3-aminophthalic p-tolyl-imide | H | " | red |
| 319 | 1-aminoanthraquinine | H | " | reddish brown |
| 320 | aminoazobenzene | H | " | ruby |
| 321 | chloroaminoazobenzene | H | " | reddish violet |
| 322 | bromoaminoazobenzene | H | " | reddish violet |
| 323 | 3-amino-5-nitrobenzoisothiazole-(2,1) | H | " | navy blue |
| 324 | " | $C_6H_5$ | " | navy blue |
| 325 | " | $C_6H_4CH_3$(p) | " | navy blue |
| 326 | 3-amino-5-nitro-7-bromo-benzoisothiazole-(2,1) | H | " | navy blue |
| 327 | " | $C_6H_5$ | " | navy blue |
| 328 | 4-aminoazobenzene | H | H | orange |
| 329 | 4-amino-3-chloroazobenzene | H | H | scarlet |

The following are also suitable as dyes:

| Ex. No. | | Hue |
|---|---|---|
| 330 | [phenyl-N=N-(3-Cl-phenyl)-N=N-(4-CH3-5-CN-2,6-diamino-pyridine)] | orange |

-continued
| | | |
|---|---|---|
| 331 | 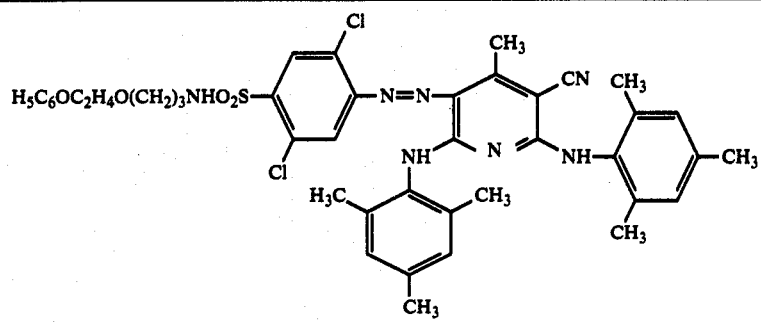 | yellow |
| 332 | 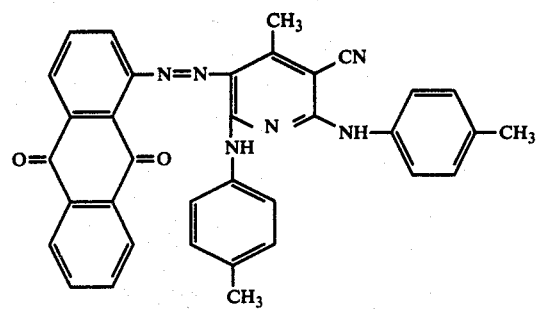 | brown |
| 333 | 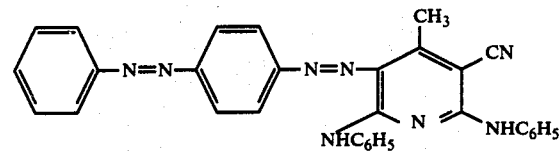 | red |
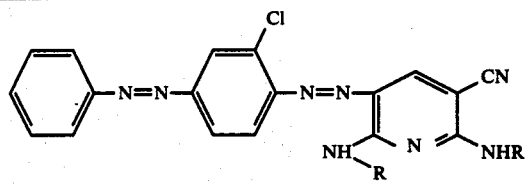
| Ex. No. | R | Hue |
|---|---|---|
| 334 | $C_6H_5$ | red |
| 335 | $C_6H_4CH_3(o)$ | red |
| 336 | $C_6H_4CH_3(p)$ | red |
| 337 | | red |
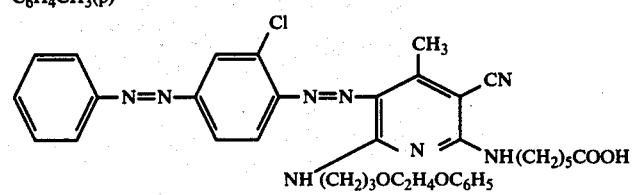
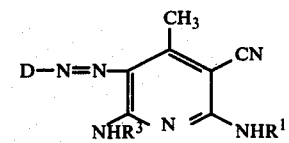
| Ex. No. | D | $R^1$ | $R^3$ | Hue |
|---|---|---|---|---|
| 338 | 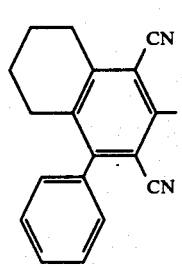 | $(CH_2)_3O(CH_2)_2OC_6H_5$ | $(CH_2)_3(CH_2)_2OC_6H_5$ | orange |

-continued

| | | | | |
|---|---|---|---|---|
| 339 | 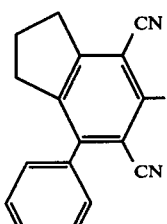 | " | " | orange |
| 340 | " | " | 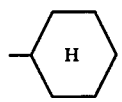 | orange |
| 341 | " | " | 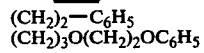 | orange |
| 342 | " | " | (CH$_2$)$_2$—C$_6$H$_5$ | orange |
| 343 | " | " | (CH$_2$)$_3$O(CH$_2$)$_2$OC$_6$H$_5$ | orange |
| | | 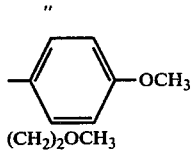 | | |
| 344 | 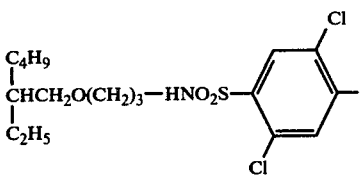 | (CH$_2$)$_2$OCH$_3$ | (CH$_2$)$_2$OCH$_3$ | orange |
| 345 | " | (CH$_2$)$_3$OCH$_3$ | (CH$_2$)$_3$OCH$_3$ | orange |
| 346 | " | (CH$_2$)$_3$O(CH$_2$)$_2$OC$_6$H$_5$ | (CH$_2$)$_3$O(CH$_2$)$_2$OC$_6$H$_5$ | orange |
| 347 | " | (CH$_2$)$_2$OCH$_3$ | (CH$_2$)$_2$OCH$_3$ | orange |
| 348 | 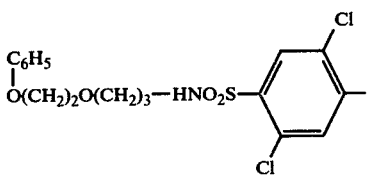 | (CH$_2$)$_3$OCH$_3$ | (CH$_2$)$_3$OCH$_3$ | orange |
| 349 | " | (CH$_2$)$_3$O(CH$_2$)$_2$OC$_6$H$_5$ | (CH$_2$)$_3$O(CH$_2$)$_2$OC$_6$H$_5$ | orange |
| 350 | 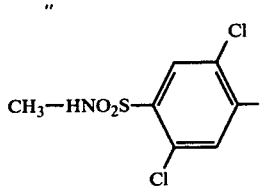 | (CH$_2$)$_3$O(CH$_2$)$_2$OC$_6$H$_5$ | (CH$_2$)$_3$O(CH$_2$)$_2$OC$_6$H$_5$ | orange |
| 351 | " | " | " | orange |
| 352 | 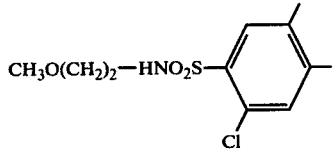 | " | " | orange |
| 353 | 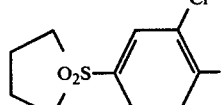 | " | " | orange |
| | 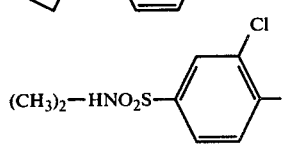 | | | |

-continued
| | | | | |
|---|---|---|---|---|
| 354 | 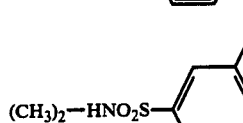 | " | " | orange |
| 355 | 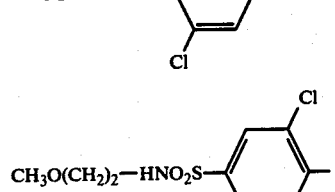 | " | " | orange |
| 356 | 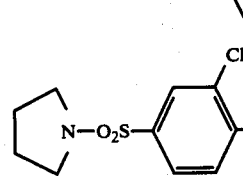 | " | " | orange |
| 357 | 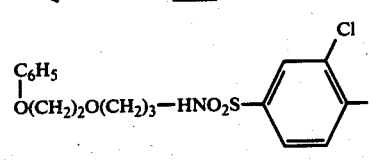 | " | " | orange |
| 358 |  | " | " | orange |
| 359 | " | $NH_2$ | " | orange |
| 360 | " | $(CH_2)_2OCH_3$ | $(CH_2)_2OCH_3$ | orange |
| 361 | " | $(CH_2)_3OCH_3$ | $(CH_2)_3OCH_3$ | orange |
| 362 | 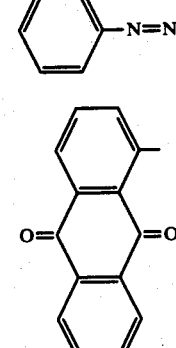 | $(CH_2)_3O(CH_2)_2OC_4H_9$ | $(CH_2)_3O(CH_2)_2OC_4H_9$ | red |
| 363 | 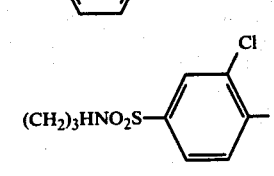 | " | " | brown |
| 364 | 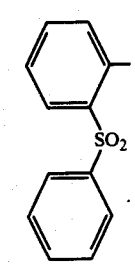 | " | " | orange |
| 365 | | " | " | orange |

-continued

| 366 | 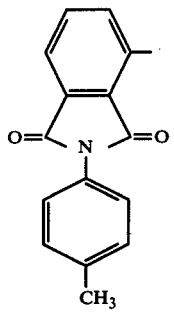 | " | " | orange |
| 367 | 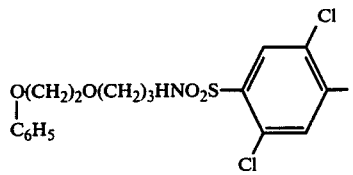 | " | " | orange |

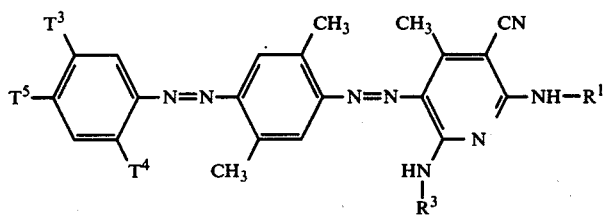

| Ex. No. | T³ | T⁴ | T⁵ | R³ | R¹ | Hue |
|---|---|---|---|---|---|---|
| 368 | —SO₂NH(CH₂)₃O(CH₂)₂OC₆H₅ | H | H | (CH₂)₂OCH₃ | (CH₂)₂OCH₃ | red |
| 369 | " | " | " | (CH₂)₃OCH₃ | (CH₂)₃OCH₃ | red |
| 370 | " | " | " | (CH₂)₃O(CH₂)₂OC₆H₅ | (CH₂)₃O(CH₂)₂OC₆H₅ | red |
| 371 | " | " | " | (CH₂)₃O(CH₂)₂OC₆H₅ | (CH₂)₃O(CH₂)₂OC₆H₅ | red |
| 372 | " | Cl | " | " | " | red |
| 373 | " | Cl | " | (CH₂)₂OCH₃ | (CH₂)₂OCH₃ | red |
| 374 | " | Cl | " | (CH₂)₃OCH₃ | (CH₂)₃OCH₃ | red |
| 375 | —CONH(CH₂)₃O(CH₂)₂OC₆H₅ | H | " | " | " | red |
| 376 | " | H | " | (CH₂)₂OCH₃ | (CH₂)₂OCH₃ | red |
| 377 | " | H | " | (CH₂)₃O(CH₂)₂OC₆H₅ | (CH₂)₃O(CH₂)₂OC₆H₅ | red |
| 378 | Cl | | Cl | SO₂NH(CH₂)₃OC₂H₄OC₆H₅ | | red |

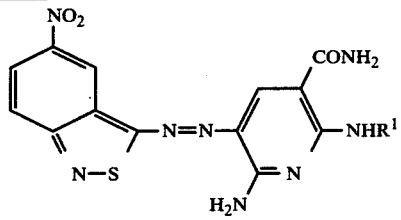

| Ex. No. | R¹ | Hue |
|---|---|---|
| 379 | —(CH₂)₂—⌬H | bluish violet |
| 380 | —⌬—O(CH₂)₂OC₆H₅ | blue |
| 381 | —⌬—O(CH₂)₂O(CH₂)₂OCH₃ | blue |
| 382 | —(CH₂)₃O(CH₂)₂OC₄H₉ | bluish violet |
| 383 | (CH₂)₃OC₂H₄O—⌬H | blue |

-continued
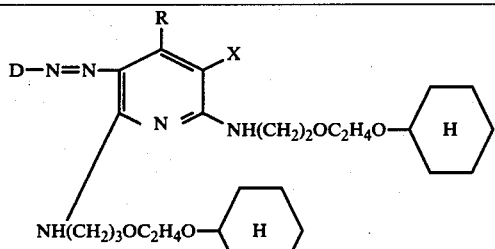
| Example | D | R | X | Hue |
|---|---|---|---|---|
| 384 | (phenyl-N=N-tolyl) | CH₃ | CN | scarlet |
| 385 | " | H | CN | scarlet |
| 386 | " | H | CONH₂ | red |
| 387 | (phenyl-N=N-chlorophenyl) | CH₃ | CN | red |
| 388 | " | H | CN | red |
| 389 | " | H | CONH₂ | ruby |
| 390 | (CN-phenyl) | CH₃ | CN | yellow |
| 391 | " | H | CONH₂ | orange |
| 392 | (Cl, H₃CO₂S-phenyl) | CH₃ | CN | yellowish orange |
| 393 | " | H | CONH₂ | reddish orange |
| 394 | (phthalimide-C₆H₄CH₃(p)) | CH₃ | CN | orange |
| 395 | " | H | CONH₂ | scarlet |
We claim:
1. The dye of the formula
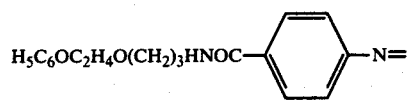
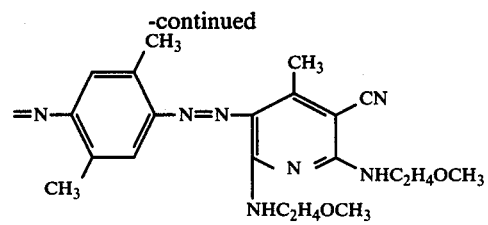
* * * * *